May 5, 1964 G. K. NEWELL 3,131,788
ELECTRICALLY CONTROLLED BRAKE SYSTEMS FOR RAILWAY
CARS EMPLOYING SPRING-APPLIED POWER-RELEASED
UNIT BRAKE ASSEMBLIES
Filed Jan. 22, 1962 6 Sheets-Sheet 1

INVENTOR.
George K. Newell
BY
*A. A. Steinmiller*
Attorney

INVENTOR.
George K. Newell

INVENTOR.
George K. Newell
BY
Attorney

May 5, 1964   G. K. NEWELL   3,131,788
ELECTRICALLY CONTROLLED BRAKE SYSTEMS FOR RAILWAY
CARS EMPLOYING SPRING-APPLIED POWER-RELEASED
UNIT BRAKE ASSEMBLIES
Filed Jan. 22, 1962   6 Sheets-Sheet 5

INVENTOR.
George K. Newell
BY
*G. G. Steinmiller*
Attorney

May 5, 1964  G. K. NEWELL  3,131,788
ELECTRICALLY CONTROLLED BRAKE SYSTEMS FOR RAILWAY
CARS EMPLOYING SPRING-APPLIED POWER-RELEASED
UNIT BRAKE ASSEMBLIES
Filed Jan. 22, 1962  6 Sheets-Sheet 6

INVENTOR.
George K. Newell
BY *A. G. Steinmiller*
Attorney

United States Patent Office 3,131,788
Patented May 5, 1964

3,131,788
ELECTRICALLY CONTROLLED BRAKE SYSTEMS FOR RAILWAY CARS EMPLOYING SPRING-APPLIED POWER-RELEASED UNIT BRAKE ASSEMBLIES
George K. Newell, Level Green, Penn Township, Westmoreland County, Pa., assignor to Westinghouse Air Brake Company, Wilmerding, Pa., a corporation of Pennsylvania
Filed Jan. 22, 1962, Ser. No. 167,690
18 Claims. (Cl. 188—153)

This invention relates to electrically-controlled brake systems for railway rolling stock and more particularly to electrically-controlled brake systems employing so-called spring applied power released package brake or unit assemblies wherein the brake mechanism is mounted on or contained in a casing for installation and removal as a unit.

Until recently, conventional brake rigging for railway cars consisted of one or more brake cylinders carried on the underside of the car body and having the piston rod thereof connected through rods and levers to the brake shoes, independently hung on brake shoe hangers from the truck frame, to effect movement of all of the brake shoes on the car into and out of contact with the tread of the car truck wheels.

The conventional type of brake rigging cannot conveniently be employed on certain new type cars, such as the new lightweight cars, due to limitation of space and weight requirements. Consequently, more recently there has been proposed for use on railway cars, such as subway and rapid transit cars, a brake rigging of the package or unit brake type wherein a brake assembly provided for each individual wheel on the car may be installed or removed as a unit. A unit brake assembly of this type is described and claimed in Patent No. 2,940,554, issued June 14, 1960, to Mortimer B. Cameron, and assigned to the assignee of this application.

The unit brake assemblies of the type described in the hereinbefore-mentioned patent are of the so-called air applied spring released type. Unit brake assemblies of the air applied spring released type do not provide for an application of the brakes in case of loss of fluid under pressure. Therefore, upon loss of air pressure, auxiliary safety brake means is required for effecting an emergency application of the brakes.

The general purpose of this invention is to provide a novel spring applied hydraulic pressure released unit brake assembly and a control system therefor, whereby the brakes are automatically spring applied upon the loss of hydraulic pressure from any cause.

This invention comprises a novel package or unit brake assembly for each individual wheel of a railway car truck wherein the brakes are normally maintained released by power means, in the form of a hydraulic pressure actuated piston or an electrical torque motor, and are applied by a power spring of the clock or spiral type upon the removal of the releasing force exerted by the power means. This type of brake provides a safety feature which is very important to both the lading and the operating crew of a freight train or to the passengers and operating crew of a passenger train or subway car. A novel and inexpensive electric control system is provided for controlling the supply of electric current to the torque motors or the supply of hydraulic pressure fluid to and the release of hydraulic pressure fluid from the piston of the brake apparatus on the different cars of a train. The electrically-controlled spring applied hydraulically released brake system provided by this invention is relatively inexpensive, simple and readily adaptable to existing rolling stock for effecting braking.

In the accompanying drawings:
FIG. 1 is a diagrammatic view of an electric control system for a multiple vehicle train in which each car is provided with a plurality of spring applied hydraulic pressure released unit brake assemblies embodying the invention.

*Description—FIGS. 1 to 4*

Figure 1:
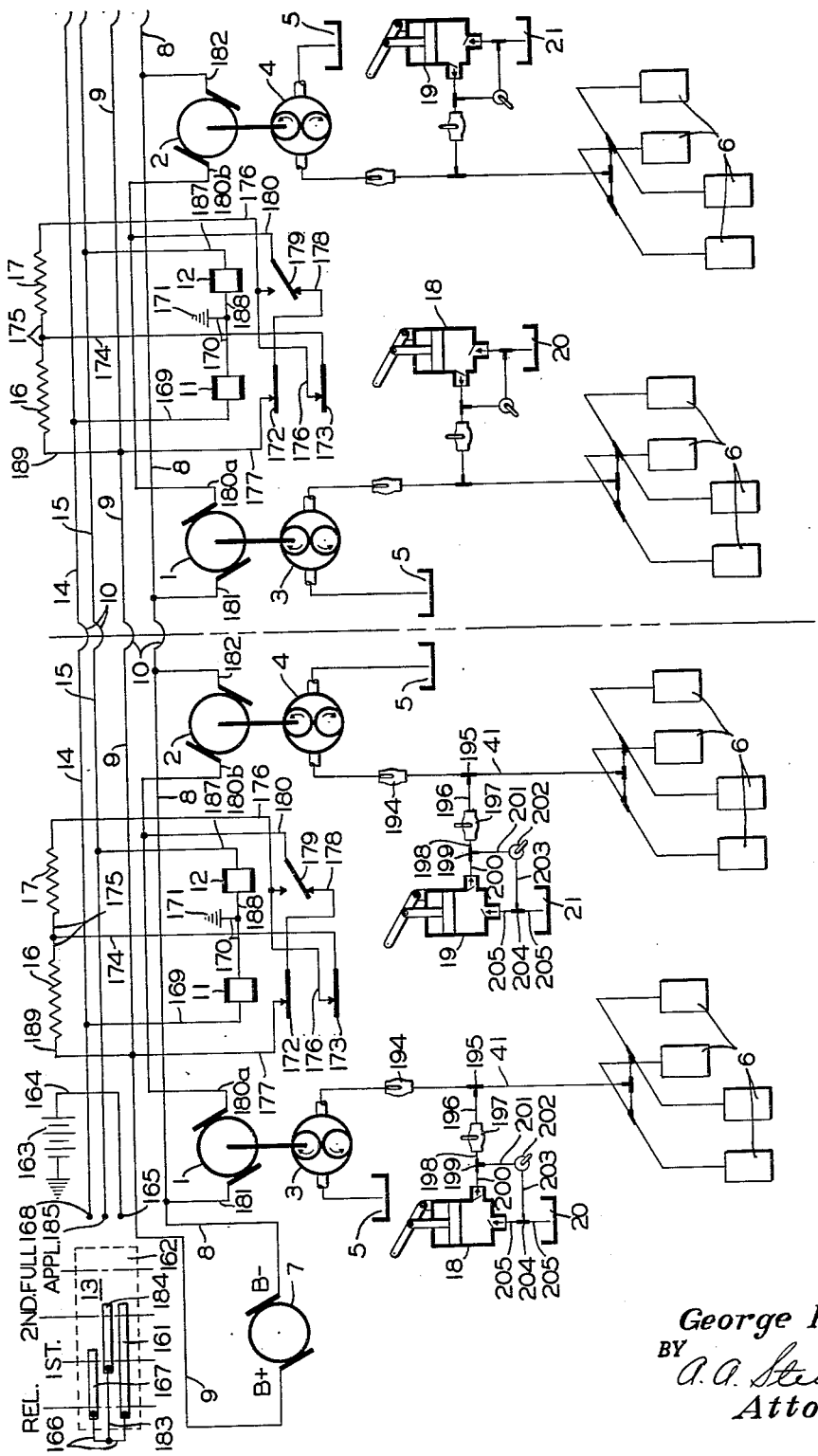

FIG. 1 of the drawings shows a multiple unit, electrically-controlled, spring applied hydraulically released brake system for a train of railway vehicles comprising for each vehicle two electric torque motors 1 and 2 which respectively drive pumps 3 and 4, illustratively shown as of the gear type, through drive shafts as shown. Each of the pumps 3 and 4 supplies hydraulic fluid under pressure from a respective sump 5 to each of four unit brake assemblies 6 associated respectively with the four wheels of one of the two trucks of each railway vehicle. To control the operation of the motors 1 and 2 on each of the cars, there is provided on the leading car a generator 7 which is adapted to supply a suitable voltage to each of the motors on each of the cars through a pair of train wires 8 and 9 extending from end to end through each car of the train and each connected between cars by a suitable electrical connector 10 that connects adjacent ends on two adjacent cars. Also provided on each car are control relays 11 and 12 that control the amount of resistance in the power supply circuit of the respective car motors 1 and 2 for varying the energization of or amount of current flowing through these two motors. The control relays 11 and 12 on each of the several cars of a train are controlled by a switch mechanism or controller 13 located on the lead car which controller is manually operated by the engineer to effect energization and deenergization of a pair of control wires 14 and 15 extending through each car and each connected by an electrical connector 10 that connects adjacent ends on two adjacent cars. The control relays 11 and 12 are provided with contacts which according to their picked-up or dropped-out position cut in or cut out one or both of two resistances 16 and 17 on each car to vary the current flow through the motors 1 and 2 on the respective car.

In order to provide for release of the brakes in case of failure of the pumps or torque motors on the respective cars, each car is provided with two hand pumps 18 and 19 which can be respectively manually operated to supply hydraulic fluid from respective sumps 20 and 21 to the four unit brake assemblies 6 associated with one truck of the car and to the four unit brake assemblies 6 associated with the other truck of the car, respectively.

Figure 2:
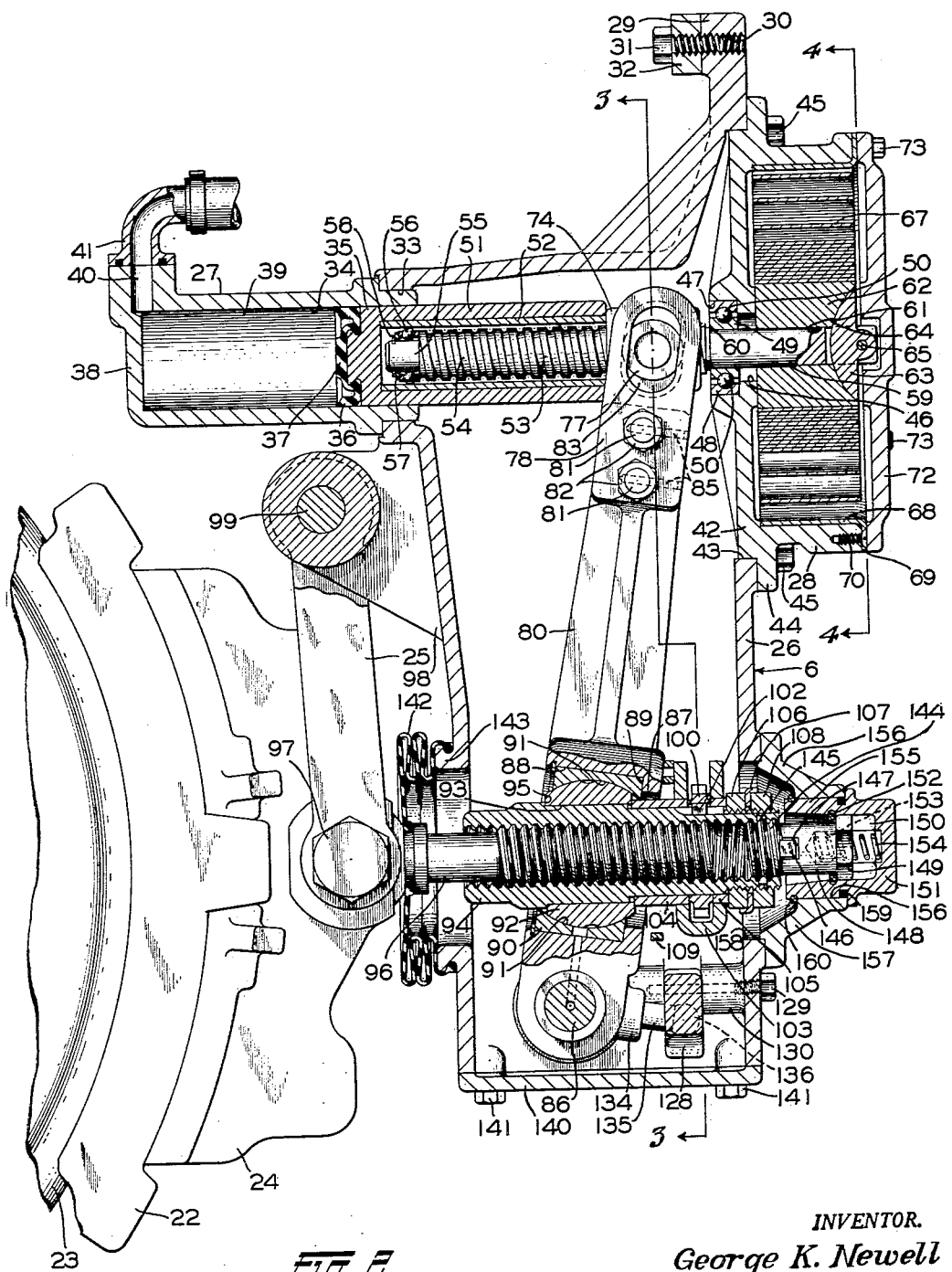
FIG. 2 is a vertical cross-sectional view of one brake unit of FIG. 1 showing a spring-applied hydraulic pressure released brake linkage and a slack adjuster mechanism therefor.

As shown in detail in FIG. 2, each of the brake assemblies 6 comprises a brake shoe 22 for movement into and out of braking contact with the tread of a wheel 23 of the car truck, a brake head 24 to which the brake shoe 22 is secured in the usual manner by a key (not shown), an external brake head hanger 25, and a sectionalized casing comprising a main casing section 26, a brake cylinder section 27, and a spring case 28.

Former integral with the main casing section 26 is a pair of spaced-apart bosses 29, only one of which is shown in FIG. 2, each provided with a threaded bore 30 for receiving a cap screw 31 whereby the main casing section 26 is rigidly secured to a pair of angle brackets 32 attached, as by welding, to a center sill or other transverse member (not shown) of a railway car truck frame.

The brake cylinder casing section 27 is cylindrical in form and separably secured, as by cap screws (not shown), to the left-hand side of the left-hand wall of the main casing section 26 in registry with an opening 33 in the left-hand wall in the main casing section 26. Slidably operable in a bore 34 in the casing section 27 is a hydraulic pressure actuated brake release piston 35.

A packing cup 36 of the snap-on type is secured to the pressure face of the piston 35, and has a lug 37 thereon which, when piston 35 occupies its brake applied position, contacts a pressure head 38 which closes the left-hand end of brake cylinder section 27. A pressure chamber 39 is thus formed between the pressure head 38 and piston 35 to which hydraulic fluid under pressure may be supplied through a port 40 and a pipe 41 having, as shown in FIG. 1, at one end four branches leading respectively to the four brake assemblies 6 on one truck of a car and having its opposite end connected to the outlet or discharge of one of the pumps 3 or 4.

The spring case 28 (FIG. 2) is open at its right-hand end and has a wall 42 at its left-hand end. The wall 42 is annular so as to fit in a bore 43 formed in the right-hand side wall in the main casing section 26. The spring case 28 has adjacent the wall 42 an offset annular flange 44 whereby the spring case 28 is rigidly secured to the main section 26 by a plurality of cap screws 45, two of which are shown in FIG. 2. The wall 42 of the spring case 28 has a bore 46 and a coaxial counterbore 47. This bore 46 and counterbore 47 are coaxial with the bore 34 in the brake cylinder section 27.

Disposed in the counterbore 47 is a ball bearing assembly comprising an outer race 48 and an inner race 49 between which are disposed a plurality of balls 50.

The right-hand side, as viewed in FIG. 2, of piston 35 is provided with a central boss or sleeve 51 formed integral therewith. Press-fitted into the sleeve 51 is a bushing 52 within which is received one end of a screw 53 having a specially formed concave helical groove or ball race 54. The left-hand end of the screw 53 is provided with a reduced portion 55 on which is mounted a ball bearing element 56 retained in place by a washer 57 and a snap ring 58 that is inserted in a groove formed in the reduced portion 55. As can be seen from FIG. 2, the balls of the ball bearing 56 roll on the outside of the reduced portion 55 and on the interior wall of the bushing 52 to provide for rotation of the screw 53 within the sleeve 51 and bushing 52. The right-hand end of the screw 53 is provided with a cylindrical portion 59 of reduced diameter which has at its left-hand end a shoulder 60 against which rests the left-hand side of the inner race 49 of the ball bearing which inner race is press-fitted onto the cylindrical reduced portion 59 and rotates therewith.

That portion of the cylindrical reduced portion 59 of the screw 53 to the right of the inner race 49 and outer race 48, as viewed in FIG. 2, extends through the bore 46 in the spring case 28 and through a coaxial bore 61 formed in a hub 62 that is disposed within the spring case 28. As can be seen from FIGS. 2 and 4, the right-hand end of the cylindrical reduced portion 59 of the screw 53 is bifurcated to receive a key 63 which is arcuate-shaped on one side whereby this key fits in a corresponding arcuate-shaped slot or keyway 64 formed in the hub 62. The key 63 is anchored to the bifurcated end of the reduced portion 59 of the screw 53 by a pin 65 that extends through the key 63 and jaws on each side thereof, which jaws are formed by the bifurcation in the end of the reduced cylindrical portion 59 of the screw 53.

Figure 4:
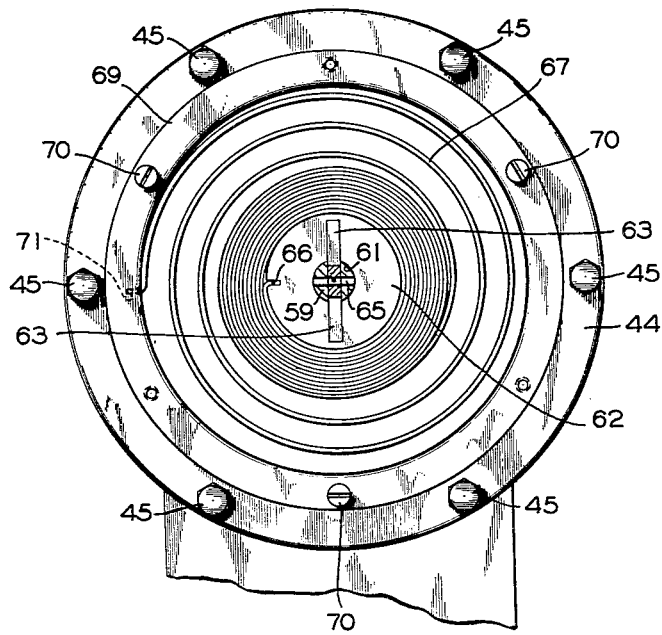
FIG. 4 is a cross-sectional view, taken along the line 4—4 of the brake assembly of FIG. 2 and looking in the direction of the arrows, showing certain details of a spiral or clock type of spring applying mechanism.

By referring to FIG. 4, it will be seen that the periphery of the hub 62 is provided with a slot 66 in which is received the inner end of a spiral spring 67 that is disposed within a bushing 68 (FIG. 2) that is coaxially disposed within the spring case 28. The bushing 68 has at one end an outturned flange 69 which, as shown in FIGS. 2 and 4, is secured to the open end of the spring case 28 by a plurality of machine screws 70. As shown in FIG. 4, the outer end of the spiral spring 67 is bent to be received in a slot 71 that extends through the bushing 68 and into the wall of the spring case 28 a chosen distance which is sufficient to securely anchor this outer end of the spiral spring 67 to the spring case 28. The open end of the spring case 28 is closed by a cover 72, the outer periphery of which fits against the flange 69 of the bushing 68. This cover 72 is securely secured to the spring case 28 by means of a plurality of cap screws 73, two of which are shown in FIG. 2, it being understood that these cap screws extend through bores in the flange 69 and into corresponding threaded bores in the casing 28.

Figure 3:
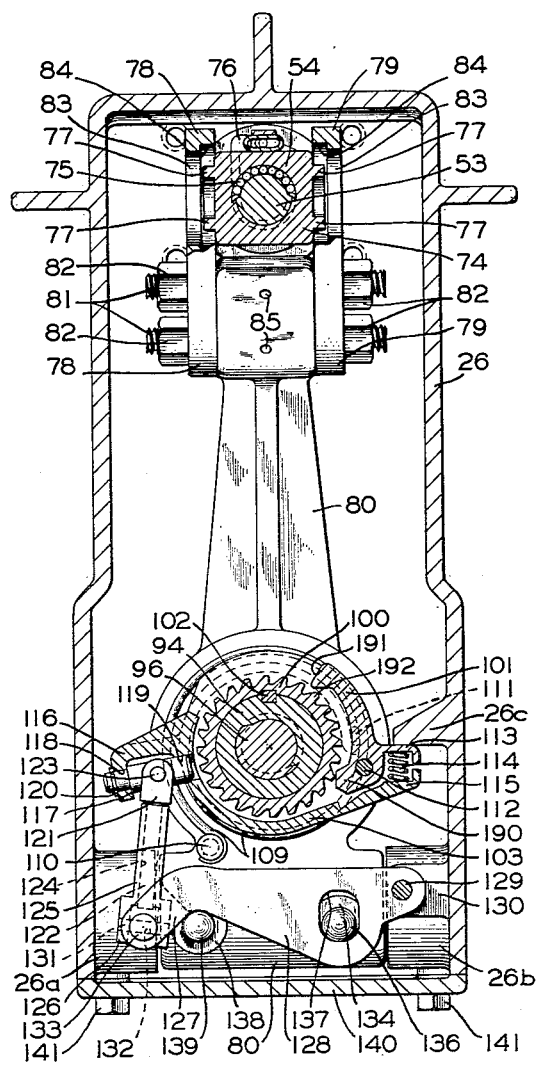
FIG. 3 is a cross-sectional view, taken along the line 3—3 of the unit brake assembly of FIG. 2 and looking in the direction of the arrows, showing further structural details.

As shown in FIG. 3, the screw 53 has mounted thereon a traveling nut 74 which nut has formed internally a concave helical groove or ball race that corresponds to the ball race 54 on the nut 53. A plurality of balls 75 are disposed in the ball race 54 and the corresponding internal ball race in the traveling nut 74. The traveling nut 74 is provided or fitted with a tubular ball guide 76 which interrupts the path of the balls 75, deflects them from the helical ball race 54 and the corresponding race in the nut 74, guides them diagonally across the outside of the nut 74, and leads them back again into the ball race 54 in the screw 53 and the corresponding race in the nut 74 at a point longitudinally spaced along the screw 53 from the point at which they leave the ball race 54 to enter the ball guide 76. This arrangement forms a closed circuit through which the rolling balls 75, as the medium of engagement between the screw 53 and the nut 74, recirculate continually as the screw 53 and nut 74 are rotated relative to each other. Thus, the rotary motion of the screw 53 is changed to linear motion of the nut 74, or vice versa, with minimum frictional loss.

It should be understood that the screw 53 and the nut 74 may be any suitable commercial type of ball bearing screw.

As can be seen from FIG. 3, each side of the nut 74 is provided with a hollow circular boss 77 and the nut 74 is disposed between two jaws 78 and 79 which are secured to a brake lever 80 by means of two studs 81 each having on its opposite ends a nut 82 which nuts when tightened against the jaws force them against the end of the lever 80 so that the jaws 78 and 79 form a clevis. As shown in FIGS. 2 and 3, each of the jaws 78 and 79 is provided with a slot 83 and a counterslot 84 in each of which counterslots 84 one of the hollow circular bosses 77 is disposed so that the bosses 77 on the nut 74 and the jaws 78 and 79 cooperate to form an operative connection between the screw 53 and the brake lever 80. In order to prevent turning of the studs 81 with respect to the lever 80 each of these studs is anchored to the lever by a pin 85 (FIG. 3) that extends through the upper end of the lever 80 and the respective stud.

It should be noted that the pitch of the screw 53 is such that when hydraulic fluid under pressure is supplied to the chamber 39 to act on the piston 35, the piston will move in the direction of the right hand, as viewed in FIG. 2, and thereby transmit a thrust to the left-hand side of the nut 74 which is restrained from rotation by being disposed between the jaws 78 and 79 at the upper end of the brake lever 80. Consequently, since the nut 74 cannot rotate, it effects rotation of the screw 53 within the bushing 52 carried by the sleeve 51 as the traveling nut 74 travels along the screw 53 in the direction of the right hand. Furthermore, rotation of the screw 53 causes the traveling nut 74 to travel along the screw 53 reversely in consequence of the unwinding of the spiral spring 67 in a manner hereinafter described in detail.

The brake lever 80 is tapered for a portion of its length from one end towards the opposite end (see FIG. 3). As shown in FIGS. 2 and 3, the lower end of the brake lever 80 is pivotally mounted on a pin 86, the opposite ends of which are carried in coaxial bores in a pair of oppositely arranged and inwardly facing bosses 26a and 26b formed on the opposite walls of main casing section 26.

The lever 80 has a bore 87 and a counterbore 88 (see FIG. 2) the axis of which is disposed at right angles to and above the axis of the pin 86. Press-fitted into the counterbore 88 and having one end resting against a shoulder 89 formed at the right-hand end of the counterbore 88 is a two-piece split bushing 90. Each half of the bushing 90 is provided with a cavity 91 in the form of a section of a sphere to form a seating surface for a member 92, the outer surface of which constitutes a zone of a sphere.

The member 92 is provided with a bore 93, the axis of which is also disposed at right angles to and above the axis of the pin 86 and, when in the position shown in FIG. 2, at an acute angle to the axis of the bore 87. Disposed in the bore 93 with a light fit is an internally threaded sleeve member 94 having adjacent its left-hand end, as seen in FIG. 2, a shoulder 95 against which abuts the left-hand end of member 92.

A brake rod 96, threaded at one end, has screw-threaded engagement with the internally threaded sleeve member 94, and at the other end is pivotally connected to one end of the brake head hanger 25 and the brake head 24 as by a bolt 97 and nut (not shown). The brake hanger 25 comprises two identical parallel links disposed respectively on the opposite sides of a bracket 98 integral with the main casing section 26, and suspended from the bracket 98, as by means of a bolt 99. The bolt 99 is secured against removal from the brake head hanger links and the bracket 98 by a nut (not shown).

It is apparent from FIG. 2 that, as the braking surface of the brake shoe 22 wears away, the travel of the brake rod 96 in the direction of the left hand will increase progressively with successive applications of the brakes. Therefore, in order to maintain the same travel distance of the brake rod 96, upon each subsequent application of the brakes as the brake shoe 22 wears away, the brake assembly 6 is provided with a slack take-up or adjusting mechanism which will now be described in detail.

The slack adjusting mechanism of the brake assembly, shown in FIGS. 2 and 3, comprises, in addition to the threaded portion of brake rod 96 and the internally threaded sleeve member 94 which has screw-threaded engagement with the threaded portion of the brake rod 96, a ratchet wheel 100, a pawl 101 (FIG. 3), and a driving mechanism operatively connecting the pawl 101 to the brake lever 80.

The ratchet wheel 100 is keyed to the sleeve member 94 by means of a key 102 which fits into oppositely disposed keyways formed in the sleeve member and the ratchet wheel. The ratchet wheel 100 is disposed in a U-shaped member 103 the opposite sides of which are mounted on bushings 104 and 105 respectively carried on the periphery of the internally threaded sleeve member 94. The left-hand end of the bushing 104 is in abutting contact with the right-hand end of the member 92. The right-hand end of the bushing 104 abuts the left-hand side of the ratchet wheel 100. The right-hand side of the ratchet wheel 100 is retained in abutting contact with the bushing 105 by a retaining nut member 106 having screw-threaded engagement with screw threads formed on the right-hand end of the sleeve member 94. The retaining nut member 106 is prevented from working loose by means of a washer 107 and a lock nut 108 that has screw-threaded engagement with the screw threads formed on the left-hand end of the sleeve member 94.

A torsion spiral spring 109 encircles the bushing 104 between the right-hand side of the lever 80 and the left-hand side or leg of the U-shaped member 103, as shown in FIG. 2.

As shown in FIG. 3, the outer end of the torsion spiral spring 109 is anchored to a pin 110 that is carried by the brake lever 80 adjacent its lower end. The inner end of the torsion spiral spring 109 is anchored to a lug 111 (see FIG. 3) that extends outward from and is integral with the left-hand leg of the U-shaped member 103, as viewed in FIG. 2.

The pawl 101 is pivotally mounted between the legs of the U-shaped member 103 on a pin 112 that extends through the pawl and each leg of the U-shaped member 103. The pawl 101 is provided with an arm 113, as shown in FIG. 3, which constitutes a spring seat for a spring 114 that is disposed between the spring seat constituted by the arm 113 and a similar spring seat constituted by an arm 115 that is formed integral with the U-shaped member 103, as indicated in FIG. 3. The spring 114 is effective to bias the pawl 101 in a counterclockwise direction about the pin 112 in the direction of the teeth formed on the ratchet wheel 100 when the U-shaped member 103 is rotated in a clockwise direction from the position in which it is shown in FIG. 3 in which position the arm 113 rests against a lug 26c extending inward from the right-hand wall of the main casing section 26, by means now to be described.

As shown in FIG. 3, the U-shaped member 103 is provided with an elbow-like arm 116 which is adapted to carry one end of a pin 117 in a bore 118 in the elbow-like arm 116, the opposite end of the pin 117 being carried in a bore 119 formed in the U-shaped member 103. The pin 117 is retained in place by a snap ring 120 that is inserted in a groove adjacent the left-hand end of the pin 117 as viewed in FIG. 3.

Intermediate the ends of the pin 117 and disposed on opposite sides thereof are the jaws of a clevis 121 formed at the upper end of a rod 122, the clevis 121 being operatively connected to the pin 117 by a pin 123 smaller in diameter than the pin 117 and extending through a bore in the pin 117 and coaxial bores in the jaws in the clevis 121. The rod 122 is slidably disposed in a bore 124 formed in a link 125, which link has at its lower end, as shown in FIG. 3, a clevis 126. The clevis 126 is disposed between the jaws of a clevis 127 formed at the left-hand end of a lever 128 which, as shown in FIG. 3, is pivotally mounted at its right-hand end on a pin 129 carried by two bosses 130 extending inward from the right-hand wall of the main casing section 26 only one of the bosses 130 appearing in FIG. 3.

The clevis 126 is connected to the clevis 127 by means of a first pin 131 carried at its opposite ends in the jaws of the clevis 126 and extending through a bore 132 in a second pin 133, the diameter of which is slightly less than the distance between the jaws of the clevis 126 and which has its opposite ends carried in the opposite jaws of the clevis 127.

As shown in FIGS. 2 and 3, the lower end of the brake lever 80 is provided with a boss 134 from which extends a cylindrical lug 135 (FIG. 2) having on its exterior end a spherical member 136 which extends or passes through a slot 137 in the lever 128 (FIG. 3). As shown in FIG. 3, the brake lever 80 is also provided adjacent its lower end with a second boss 138 spaced to the left of the boss 134 from which boss 138 extends a lug having on its exterior end a spherical member 139 upon which rests the left-hand end of the lever 128. The spherical members 136 and 139 effect rocking of the lever 128 about the pin 129 in response to counterclockwise rocking of brake lever 80 about pin 86 in a manner hereinafter described in detail.

In order to provide for access to the parts of the slack adjusting mechanism for replacement and repairs, the main casing section 26 is provided with a removable bottom cover 140 which is secured to the main casing 26 by a plurality of cap screws 141.

As shown in FIG. 2, the left-hand end of the brake rod 96 extends through a suitable opening in the left-hand wall of the main casing section 26 to the exterior thereof. In order to prevent the entrance of water, ice and dirt to the interior of the main casing section 26, a rubber boot 142 surrounds the opening in the left-hand wall of the main casing section 26. The opposite inturned ends of the boot 142 are provided with beads which fit, respectively, in a groove formed in the brake rod 96 and a groove formed in a boss 143 formed on the left-hand vertical face of the left-hand wall of the main casing section 26.

A key member 144 is screw-threaded into the right-hand threaded end of the internally threaded sleeve member 94 and is locked against rotation by a pin 145 that extends through the internally threaded sleeve member 94 and the key member 144. The key member 144 is provided on its right-hand side, as viewed in FIG. 2, with a key or lug 146. This key 146 is disposed in a slot 147 formed in the left-hand end of a dog 148 that has a polygonal collar 149 formed on its right-hand end. The polygonal collar 149 is disposed in a corresponding polygonal recess 150 formed in an adjusting nut 151 and retained in this recess by a snap ring 152. The polygonal collar 149 and the dog 148 are provided with a recess 153 in which is disposed one end of a spring 154 that has its opposite end resting against the end of the polygonal recess 150 in the adjusting nut 151 so that the spring 154 is effective to bias the dog 148 in the direction of the key 146 formed on the key member 144 and against the snap ring 152. The adjusting nut 151 has, at its left-hand end, a sleeve portion 155 that has a turning fit in a bore 156 that extends through a closure member 157 that closes an opening 158 in the right-hand wall of the main casing section 26. The sleeve portion 155 of the adjusting nut 151 is provided with a peripheral groove in which is inserted an O-ring 159 that prevents the entrance of dirt, water and ice through the bore 156 in the closure member 157 into the interior of the main casing section 26. As viewed in FIG. 2, the left-hand end of the adjusting nut sleeve 155 is provided with a snap ring 160 to prevent removal of the adjusting nut 151 from the closure member 157 and yet permit rotation of the sleeve 155 within the bore 156 with respect to the closure member 157. Therefore, by applying a wrench to the adjusting nut 151, this adjusting nut together with the polygonal collar 149, dog 148, key 146, key member 144 and internally threaded sleeve member 94 can be rotated with respect to the brake rod 96 to effect lengthening or shortening of the brake rod 96 since the key member 144 is secured to the internally threaded sleeve member 94 by the pin 145.

*Operation—Figs 1 to 4*

In operation, let it be assumed that the controller 13 is moved to its release position. When the controller 13 occupies its release position, a segment 161, which is carried in insulated relation to a drum 162 of the controller 13, is in a position to connect a battery 163 via a wire 164, a stationary contact 165, the segment 161, a wire 166, and a second segment 167, carried in insulated relation to the drum 162, to a second stationary contact 168 to which contact 168 one end of the control wire 14 is connected. The circuit for each of the control relays 11 extends from the control wire 14, which is connected to the battery 163, as previously described, via a wire 169, the coil of the respective relay 11, and a wire 170, to ground, indicated by the numeral 171. With the coil of each of the respective relays 11 thus energized, it is effective to pick up two movable contacts 172 and 173 of each relay 11. With the movable contacts 172 of the relays 11 in their picked-up or closed position, a first power supply circuit is established to the torque motors 1 and 2 on each of the respective cars in the train for effecting operation of these motors to drive the pumps 3 and 4, respectively. This circuit may be traced as follows:

As shown in FIG. 1, the generator 7 located on the leading car is connected via train wire 9 that extends from car to car through the train, since the wire 9 on each car is connected by an electric connector 10 between cars to the wire 9 on the adjacent car, a branch wire 177, the movable contact 172 of the relay 11, which movable contact is now in its picked-up position, and a wire 178 that extends from the right-hand side of the movable contact 172 to a fixed contact upon which rests one end of a movable contact 179 of the relay 12, which movable contact 179 now occupies its dropped-out position. When the contacts 179 of the respective relays 12 occupy their dropped-out position, each contact 179 is effective to connect the corresponding wire 178 to a wire 180 which is connected by a first branch 180a to the positive terminal of the torque motor 1 on the respective car and by a second branch 180b to the positive terminal of the torque motor 2 on the respective car. The negative terminals of the respective electric torque motors 1 and 2 on the respective car are connected respectively by a branch wire 181 and a branch wire 182, to the train wire 8 which, as shown in FIG. 1, is connected to the negative terminal of the generator 7 located on the lead car. It may be noted that the resistances 16 and 17 are not connected in the first power supply circuit from the generator 7 to the torque motors 1 and 2.

When the respective electric torque motors 1 and 2 on the respective cars in the train are supplied with current through the respective first power supply circuits traced above, these torque motors operate the respective pumps 3 and 4 to supply hydraulic fluid under pressure from the respective sump 5 associated with each of the pumps 3 and 4 to the respective pump discharge pipe 41. As shown in FIG. 1, the pipe 41 that is connected to the discharge of the pump 3 is provided with a plurality of branches that lead to each of the four unit brake assemblies 6 associated with one truck of the car. Likewise, the pipe 41 that is connected to the discharge of the pump 4 is provided with a plurality of branches that lead to the four unit brake assemblies 6 that are associated with the second truck of the respective car.

By referring to FIG. 2, it will be seen that the fluid under pressure supplied by the respective pump flows to the brake cylinder chamber 39 in each of the brake assemblies 6.

Fluid under pressure supplied to the chamber 39 formed between the piston 35 and the pressure head 38 of each of the brake assemblies 6 is effective to move the respective piston 35 and the corresponding sleeve 51 in the direction of the right hand, as viewed in FIG. 2. As the piston 35 and the sleeve 51 are thus moved in the direction of the right hand, the right-hand end of the sleeve 51 transmits a thrust to the left-hand side of the traveling nut 74 which is restrained from rotation by being disposed between the jaws 78 and 79 at the upper end of the brake lever 80. Consequently, since the traveling nut 74 cannot rotate, it effects rotation of the screw 53 within the bushing 52 carried by the sleeve 51 as the nut travels along the screw in the direction of the right hand. As hereinbefore stated, the cylindrical portion 59 of the screw 53 is keyed to the hub 62 by the key 63 and pin 65. Therefore, rotation of the screw 53 effects rotation of the hub 62 therewith. By reference to FIG. 4, it will be seen that the inner end of the spiral spring 67 is disposed in the slot 66 formed in the outer periphery of the hub 62. Therefore, rotation of the screw 53 and the cylindrical portion 59 thereof is effective through the hub 62 to wind up or tighten the spiral spring 67 about the hub 62 as the lever 80 is rocked to its release position in which it is shown in FIG. 2 by movement of the traveling nut 74 along screw 53. The output torque of the respective electric torque motors 1 and 2 that drive the respective pumps 3 and 4 on each of the cars is such that the piston 35 will move the brake lever 80 to its release position when the torque capacity of the respective motor balances the unwinding force of the respective springs 67 in the respective brake assembly 6 in the completely wound condition of these springs.

Since the brake lever 80 is pivotally connected to the brake rod 96 by means of the ball or universal joint formed by the two-piece split bushing 90 and the member 92, clockwise rocking of the brake lever 80 about the pin 86 is effective to move the brake rod 96 in the direction of the right hand to thereby move the brake shoe 22 of the respective brake assembly 6 out of braking contact with the corresponding wheel 23 to effect a release of the brakes.

In operation, when it is desired to effect a light brake application, the controller 13 is moved from its release position, described above, to a first braking position. When the drum 162 of the controller 13 occupies its first braking position, the segment 167 carried by the drum 162 is in a position to connect the battery 163 to the control wire 14 in the manner previously described when the controller 13 occupied its release position. Consequently, the contacts 172 and 173 of the relay 11 will remain picked up. Furthermore, when the drum 162 of the controller 13 occupies its first braking position, the battery 163 is connected to the control wire 15 as will now be described. The wire 166 that connects segment 161 to segment 167 carried by drum 162 of the controller 13 is connected by a wire 183 to a third segment 184 which is carried in insulated relation to the drum 162. When the drum 162 of the controller 13 is moved to its first braking position, the segment 184 carried thereby is moved into contact with a stationary contact 185 located at the left-hand end of the control wire 15 on the leading car in the train.

As shown in FIG. 1, one end of the operating coil of the relay 12 on each car is connected by a wire 187 to the control wire 15. The opposite end of the coil of the relay 12 is connected by a wire 188 to the wire 170 which, as hereinbefore stated, is connected to the ground 171. Therefore, when the controller 13 is moved to its first braking position, current flows from the battery 163 to the control wire 15 and thence via wire 187 on each car to the relay 12 on each of the respective cars to energize each relay 12. When the relays 12 are thus energized, each relay operates to pick up its respective contact 179 from its dropped-out position to a pick-up position in which the respective contact 179 connects the wire 180 to the wire 176 on the respective car. When the contact 179 is thus picked up to connect the wire 180 to the wire 176, it is effective to disconnect the wire 178 from the wire 180. When the contact 179 thus operates from its dropped-out position to its picked-up position, it opens the hereinbefore-described first power supply circuit to the torque motors 1 and 2 on each of the respective cars in the train. When the contact 179 occupies its picked-up position, a second power supply circuit for the motors 1 and 2 is established. This second power supply circuit for the torque motors 1 and 2, with the controller 13 now in its first braking position, extends from the positive side of the generator 7 via the wire 9, a wire 189, which has one end connected to the wire 9 and the opposite end connected to the left-hand end of the resistance 16, the resistance 16, wire 175, wire 174 and contact 173 of the relay 11, which contact is in its picked-up position, to the wire 176, thence through the contact 179 of the relay 12, which contact is now in its picked-up position, to wire 180 and thence through wire 180a to the torque motor 1 and through the wire 180b to the torque motor 2 on each of the respective cars in the train. Since the resistance 16 provided on each car is now in the second power supply circuit to the respective torque motors 1 and 2 on the respective car, this resistance in the second power supply circuit is effective to reduce the output torque of each of the torque motors 1 and 2 on the respective car. When the output torque of the torque motors 1 and 2 on the respective car is thus reduced by cutting in the respective resistances 16, the maximum discharge pressure obtainable from the pumps 3 and 4 on the respective cars is accordingly correspondingly reduced. This reduction in the maximum output pressure of the respective pumps 3 and 4 effects a corresponding reduction in the pressure of the hydraulic fluid acting in the chamber 39 of each of the brake assemblies 6. As the pressure in the chamber 39 of each of the brake assemblies 6 on the respective cars in the train is thus reduced, the force acting on the corresponding piston 35 in the direction of the right hand, as viewed in FIG. 2, is likewise reduced. Consequently, upon this reduction in the fluid pressure force acting on the piston 35, there is insufficient force to maintain the spiral spring 67 in the respective brake assemblies 6 in its completely wound position. It is apparent, therefore, that when the force acting on the piston 35 is reduced in the manner just explained, the corresponding spiral spring 67 of each of the brake assemblies 6 unwinds to release the stored energy in the spring until the remaining stored energy in the spring balances the reduced fluid pressure force acting on the piston 35. As the respective spiral springs 67 unwind to release the stored energy therein, each of these spiral springs 67 effects, as viewed in FIG. 4, counterclockwise rotation of the corresponding hub 62 since the inner end of the respective spiral spring 67 is disposed in the slot 66 in the hub 62. Since each of the hubs 62 is connected to the reduced portion 59 of the corresponding screw 53 through the key 63 and pin 65, as has been hereinbefore described in detail, the rotation of the hub 62 by the spring 67 effects rotation of the cylindrical portion 59 of the screw 53 in the ball bearing constituted by the balls 50 and the races 48 and 49. This rotation of each of the screws 53 by the corresponding spring 67 is effective to cause the corresponding traveling nut 74 to travel along the respective screw 53 in the direction of the left hand, as viewed in FIG. 2, since the jaws 78 and 79 of the lever 80 prevent turning of the traveling nut 74. Therefore, as the traveling nut 74 in each brake assembly 6 travels in the direction of the left hand along the corresponding screw 53, the respective traveling nut 74 effects rocking of the corresponding brake lever 80 in a counterclockwise direction, as viewed in FIG. 2, about the corresponding pin 86. Since the brake lever 80 in each brake assembly 6 is pivotally connected to the corresponding brake rod 96 by means of the ball or universal joint formed by the two-piece split bushing 90 and the member 92, this counterclockwise rocking of the brake lever 80 is effective to move the brake rod 96 in the direction of the left hand to bring the brake shoe 22 carried by the brake head 24 into braking contact with the respective wheel 23 to effect a braking action on the wheel 23.

From FIG. 2, it is apparent that as the traveling nut 74 travels in the direction of the left hand along the screw 53, as explained above, it is effective through the corresponding sleeve 51 to move the piston 35 in the same direction. As the piston 35 and sleeve 51 are thus moved in the direction of the left hand, the packing cup 37 carried by the piston 35 forces the liquid now present in the chamber 39 from this chamber and thence through the pipe 41 and reversely through the respective pump 3 or 4 to the corresponding sump 5, it being understood that this reverse flow of liquid through the pump rotates the pump and corresponding torque motor connected thereto in a direction opposite the normal direction of rotation thereof. It may be noted that this reverse rotation of the pump and corresponding torque motor in a direction opposite the normal direction of rotation thereof may be effected without damage to the pump and this torque motor directly connected thereto, as hereinbefore mentioned, due to the inherent characteristics of a torque motor to withstand being both stalled and rotated in reverse simultaneously with the supply of electric power thereto.

As the brake head 24 and brake shoe 22 are moved, as described above, these members are supported and guided by the hanger 25 as this hanger is rocked about the bolt 99 carried in the bracket 98. The orientation of the hanger 25, the brake head 24, and brake rod 96 is such that the brake head 24 and the brake shoe 22 carried thereby are moved radially toward the wheel 23.

When it is desired to release the light brake application, the operator of the train will move the drum 162 of the controller 13 back to its release position. When the drum 162 is moved back to its release position, the segment 184 carried by the drum 162 is moved to a position in which it no longer establishes a circuit from the battery 163 to the control wire 15 since the segment 184, when the drum 162 occupies its release position, is out of contact with stationary contact 185 to which the left-hand end of the control wire 15 on the leading or control car in the train is connected, as shown in FIG. 1.

When the controller 13 is returned to its release position, and the supply of electric current to the control wire 15 is cut off, as just explained, the control relay 12 on each car in the train is deenergized. Upon deenergization of the control relays 12 on the respective cars, the respective contacts 179 of the relays 12 drop out to the position shown in FIG. 1 to reconnect wire 178 to wire 180 on each of the respective cars in the train. When the respective contacts 179 thus drop out, the respective resistance 16 on each of the respective cars is cut out of the power supply circuit to the corresponding torque motors 1 and 2 on the respective cars. Since the relay 11 on each of the cars is picked up when the controller 13 is in its release position, the hereinbefore-described first power supply circuit for each of the torque motors 1 and 2 on each of the respective cars is reestablished. As the corresponding resistance 16 is no longer in the power supply circuit to the torque motors 1 and 2 on the respective cars, the output torque of the respective motors 1 and 2 on each of the respective cars will increase. Consequently, the pumps 3 and 4 driven by the corresponding torque motors 1 and 2 will be rendered effective to increase the discharge pressure from these pumps, which pressure is supplied to the respective chambers 39 in each of the brake assemblies 6 to increase the pressure in these chambers to its maximum value. This increase in pressure in the chambers 39 of the respective brake assemblies 6 is effective to move the corresponding piston 35 of each of the brake assemblies 6 in the direction of the right hand, as viewed in FIG. 2, to rock the corresponding brake lever 80 clockwise and to wind up the corresponding spiral spring 67 until the fluid pressure force acting on the respective piston 35 is balanced by the force of the wound spring 67. As has been hereinbefore explained, when this balance occurs, the brake lever 80 will occupy its brake release position. This clockwise rocking of the brake levers 80 in the respective brake assemblies 6 correspondingly effects movement of the corresponding brake heads 24 and brake shoes 22 correspondingly away from the tread surface of the corresponding wheels 23 to effect a brake release on each car in the train.

In operation, at the same time as the brake lever 80 is rocked in a counterclockwise direction, as viewed in FIG. 2, in order to effect an application of the brakes, the boss 134 and lug 135 are rotated counterclockwise about the pin 86, as viewed in FIG. 2, it being understood that the boss 138 and spherical member 139, which are only shown in FIG. 3, are likewise rotated about the pin 86 in a counterclockwise direction, as viewed in FIG. 2. As the boss 138 is thus rotated with the brake lever 80, the spherical member 139, which is connected to the boss 138 by a lug not apparent in FIG. 3, effects clockwise rocking of the lever 128 about the pin 129, as viewed in FIG. 3. This clockwise rocking of the lever 128 about the pin 129 is transmitted through the pins 131 and 133 to the link 125 in which is slidably mounted the rod 122 at the upper end of which is the clevis 121. Therefore, the motion thus transmitted to the link 125 moves this link upward, as viewed in FIG. 3, until the upper end thereof contacts the lower end of the clevis 121. Since the clevis 121 is connected by the pins 123 and 117 to elbow-like arm 116 of the U-shaped member 103, as soon as the link 125 contacts the bottom of the clevis 121, further clockwise rocking of the lever 128 about the pin 129 is transmitted through the link 125 and clevis 121 to effect, as viewed in FIG. 3, clockwise rotation of the U-shaped member 103 about the bushings 104 and 105 shown in FIG. 2. As the U-shaped member 103 is thus rotated clockwise, as viewed in FIG. 3, the arm 115, which is integral with the U-shaped member 103, is moved downward and away from the stop member 26c whereupon the spring 114 is thereby rendered effective to act on the arm 113 of the pawl 101 to rotate the pawl counterclockwise about the pin 112 which is carried by the U-shaped member 103. Therefore, as the U-shaped member 103 is rotated clockwise, as viewed in FIG. 3, the spring 114 effects counterclockwise rocking of the pawl 101 about the pin 112 to move a lower portion 190 of the pawl 101 away from the teeth on the ratchet wheel 100 and to move a pawl tip 191 on the upper end of the pawl 101 in the direction of the teeth on the ratchet wheel 100. The slot 137 in the lever 128 is of such length that, when no brake shoe wear occurs, a brake shoe will be brought into braking contact with the corresponding wheel substantially at the time the spherical member 136 is brought into contact with the upper end of the slot 137. Consequently, when no brake shoe wear occurs, the only rocking movement of the lever 128 about the pin 129 is that effected by the movement of the spherical member 139 lying under the lever 128, as shown in FIG. 3.

Since the pin 11, on which the pawl 101 is pivotally mounted, is carried in the opposite sides of the U-shaped member 103, the above-described clockwise rotation of the U-shaped member 103 is effective to cause the pawl 101 to move in a downward direction (as viewed in FIG. 3) so that the pawl tip 191 of the pawl 101 slides along the back of a tooth 192 (see FIG. 3) on the ratchet wheel 100, which ratchet wheel is not rotated under these conditions by reason of the fact that it is keyed, by means of the key 102, to the sleeve member 94 which is carried by the two-piece split bushing 90 at this time being moved in the direction of the left hand, as viewed in FIG. 2, by the brake lever 80. If the brake shoe wear does not exceed a predetermined amount, pawl 101 and the pawl tip 191 will not be removed downward a sufficient distance for the pawl tip 191 to pass below the tooth 192 and drop into the space between the tooth 192 and the next adjacent tooth below it.

It will be noted from FIG. 3 that the outer end of the torsional spiral spring 109 is anchored to the pin 110 at its exterior end and has its inner end bent around the lug 111 which is integral with the U-shaped member 103. Therefore, when the U-shaped member 103 is rotated clockwise, as viewed in FIG. 3, in response to rocking of the brake lever 80 in a counterclockwise direction, as viewed in FIG. 2, in the manner hereinbefore described, the torsional spring 109 is placed under tension or wound up. Consequently, when the brakes are subsequently released under these conditions, namely, no brake shoe wear, the torsional spiral spring 109 is effective to release the tension therein or unwind itself and thereby rotate the U-shaped member 103 in a counterclockwise direction, as viewed in FIG. 3, until the arm 113 on the pawl 101 contacts the stop 26c after which continued counterclockwise rotation of the U-shaped member causes the pawl 101 to be rotated clockwise, as viewed in FIG. 3, about the pin 112 carried by the U-shaped member 103 until the pawl tip 191 moves away from the tooth 192 on the ratchet wheel 100 to the position in which it is shown in FIG. 3, in which position the lower portion 190 of pawl 101 abuts a tooth on the ratchet wheel 100 to prevent rotation of the ratchet wheel by vibration. This counterclockwise rotation of the U-shaped member 103 is effective to cause the rod 122 to follow the link 125 as this link is pulled downward, as viewed in FIG. 3, by the weight of the lever 128 as it rotates counterclockwise about the pin 129 in response to downward movement of the spherical member 139 that is carried on the end of the lug extending from the boss 138 on the brake lever 80 as the brake lever 80 is rocked back to its brake release position in which it is shown in FIG. 2 of the drawings. Consequently, when the brakes are subsequently released after a brake application in which no brake shoe wear occurs, the pawl 101 returns to its original position without effecting rotation of the ratchet wheel 100.

If, however, during a brake application, the brake shoe 22 associated with one of the brake assemblies 6 wears away, the corresponding spherical member 136 will contact the upper end of the slot 137 after which further rocking of the brake lever 80 in a brake-applying direction in response to brake shoe wear renders the spherical-like member 136 effective to rock the lever 128 clockwise about the pin 129. Since the spherical member 136 is much closer to the pin 129 than the spherical member 139, upon the spherical-like member 136 contacting the upper end of the slot 137, the lever 128 is rocked about the pin 129 through a greater angle for the same angle of rocking of the brake lever 80 than was effected by the spherical member 139 prior to the occurrence of the brake shoe wear. This clockwise rocking of the lever 128 about the pin 129 by the spherical member 136 is transmitted through the link 125 and clevis 121 at the upper end of rod 122 to the pins 117 and 123 to rotate the U-shaped member 103, as viewed in FIG. 3, in a clockwise direction through a greater angle than the U-shaped member 103 was rotated through when no brake shoe wear occurred. Therefore, when the brake shoe wear is sufficient for the pawl tip 191 to be moved downward until it passes below the outer end of the tooth 192 on the ratchet wheel 100, it will drop into the space between the tooth 192 and the next adjacent tooth below it on the ratchet wheel. With the pawl tip 191 in this position, pawl 101 will be effective to rotate the ratchet wheel 100 and sleeve member 94 as the U-shaped member 103 is rotated counterclockwise, as viewed in FIG. 3, by torsional spring 109 upon a subsequent release of the brakes. Rotation of the brake rod 96 is prevented by its connection to the brake head 24 and hanger 25. Consequently, the screw-threaded sleeve member 94 is unscrewed from the screw-threaded portion of the brake rod 96, thus moving the brake shoe 22 in the direction of the wheel 23 and taking up the slack occurring as a result of the wearing away of the brake shoe 22.

From the above, it is apparent that as the brake shoe 22 wears away, the brake rod 96, and consequently, the brake shoe 22, are moved radially and at a slight angle to the horizontal in the direction of the wheel 23 to always maintain a substantially uniform clearance between the tread of the wheel 23 and the braking surface of the brake shoe 22 when the brake shoe occupies its brake release position.

Now let it be supposed that while the brakes are released, the operator on the leading car of the train desires to effect a moderately heavy brake application to provide a retarding force acting on the respective wheels which is greater than the retarding force produced when a light brake application is effected by moving the controller 13 to its first braking position.

Assuming that the controller 13 is in its release position, the operator on the leading car in the train will now move the controller 13 from its release position to its second braking position. When the drum 162 of the controller 13 occupies its second braking position, the segment 184 carried by the drum 162 is in a position in which it contacts the stationary contact 185. It should be noted that in this second braking position of the controller 13 the segment 167 carried by the brake drum 162 does not make contact with the stationary contact 168 and that the segment 161 also carried by the drum does make contact with the stationary contact 165. Therefore, when the drum 162 of the controller 13 occupies its second braking position, the battery 163 is connected to the control wire 15 but not to the control wire 14. The battery 163 is connected to the control wire 15 through the wire 164, stationary contact 165, segment 161 carried by the drum 162, wire 166, wire 183 and segment 184, to the stationary contact 185 to which the left-hand end of the train wire 15 on the leading car in the train is connected. The control wire 15 is connected through the wire 187, the coil of the control relay 12 on each of the respective cars, the wire 188, and the wire 170 to ground 171. Therefore, current will now flow through the coil of the relay 12 on each of the respective cars to ground at 171 and energizes the respective relays 12 whereupon the contacts 179 of the respective relays 12 are picked up from their dropped-out position to their picked-up position. It will be noted that since no current is supplied to the control wire 14, the relays 11 on the respective cars will all be deenergized so that their contacts 172 and 173 occupy their dropped-out position.

When the contact 179 of each of the relays 12 occupies its picked-up position, a third power supply circuit for the torque motors 1 and 2 on each of the respective cars is established. This third power supply circuit for the torque motors 1 and 2 extends from the positive side of the generator 7 via the wire 9, the wire 189, the resistance 16, the wire 175, the resistance 17, the wire 176, the contact 179 of the relay 12, which is now in its picked-up position, to the wire 180 and then through wire 180a to the torque motor 1 and through the wire 180b to the torque motor 2 on each of the respective cars on the train. Since the resistance 16 and the resistance 17 provided on each of the cars are now connected in series in the third power supply circuit to the respective torque motors 1 and 2 on the respective cars, these two resistances in the third power supply circuit are effective to further reduce the output torque of each of the torque motors 1 and 2 on the respective cars to a value less than that obtained when the controller 13 was moved to its first braking position. When the output torque or torque capacity of the motors 1 and 2 on the respective cars is thus reduced by cutting in the respective resistances 16 and 17 connected in series, the discharge pressure obtainable from the pumps 3 and 4 on the respective cars is accordingly correspondingly reduced to a value less than that obtained when the controller 13 occupies its first braking position. This reduction in the output pressure of the respective pumps 3 and 4 on each of the respective cars effects a corresponding reduction in the pressure of the hydraulic fluid acting in the chamber 39 of each of the brake assemblies 6 to a value less than that obtained when the controller 13 was moved to its first braking position. Consequently, as the pressure in each of the chambers 39 of each of the brake assemblies 6 on the respective cars in the train is thus reduced, the force acting on the corresponding piston 35 in the direction of the right hand, as viewed in FIG. 2, is likewise reduced. Accordingly, upon this reduction in the force acting on the piston 35, there is insufficient force to maintain the spiral spring 67 in the respective brake assemblies 6 in its completely wound position. Therefore, when the force acting on each of the pistons 35 is reduced in the manner just explained, the corresponding spiral spring 67 in each of the brake assemblies 6 unwinds to release the stored energy in the spring until the remaining stored energy in the spring balances the fluid pressure force acting on the piston 35. As the respective spiral springs 67 unwind to release the stored energy therein, each of these spiral springs 67 effects, as viewed in FIG. 4, counterclockwise rotation of the corresponding hub 62 since the inner end of the respective spiral spring 67 is disposed in the slot 66 in the hub 62. Since each of the hubs 62 is connected to the reduced portion 59 of the corresponding screw 53 through the 63 and pin 65, as has hereinbefore been described in detail, the rotation of the hub 62 by the spring 67 effects rotation of the cylindrical portion 59 of the screw 53 in the ball bearing constituted by the balls 50 and the races 48 and 49 (see FIG. 2). This rotation of each of the screws 53 by the corresponding spring 67 is effective to cause a corresponding nut 74 to travel along the respective screw 53 in the direction of the left hand, as viewed in FIG. 2, to rock the lever 80 in a counterclockwise direction to effect an application of the brakes in a manner hereinbefore described. It should be noted, however, that a greater braking force is applied to the wheels than was applied when effecting a light brake application since the pressure in the chambers 39 is now less than the pressure prevalent in these chambers during a light brake application for the reasons explained above.

As the traveling nut 74 travels along the respective screw 73 in the direction of the left hand, liquid will be forced from the corresponding chamber 39 back to the respective sump 5 in the manner hereinbefore described in detail.

When it is desired to release the moderately heavy brake application, the operator of the train will move the drum 162 of the controller 13 back to its release position. When the drum 162 is thus moved back to its release position, the segment 184 carried by the drum is moved to a position in which it no longer establishes a circuit from the battery 163 to the train control wire 15 since the segment 184, when the drum 162 occupies its release position, is out of contact with stationary contact 185 to which the left-hand end of the control wire 15 on the leading or control car of the train is connected, as shown in FIG. 1.

When the controller 13 is returned to its release position, the supply of electric current to the control wire 15 is cut off, as just explained. However, current is again supplied to the control wire 14 so that the relay 11 on each of the cars is picked up. Therefore, the hereinbefore-described first power supply circuit for each of the motors 1 and 2 on each of the respective cars is re-established in the manner hereinbefore explained. Consequently, the output torque of the respective motors 1 and 2 on each of the respective cars will increase to correspondingly effect an increase in the discharge pressure from the pumps driven by these motors. Since pressure supplied by the pumps increases in the respective chambers 39 in each of the brake assemblies, this increase in the pressure in the chambers 39 is effective to move the corresponding piston 35 of each of the brake assemblies 6 to the brake release position in which they are shown in FIG. 2 to rock the corresponding brake levers 80 clockwise and to wind up the corresponding spiral springs 67 until the fluid pressure force acting on the respective pistons 35 is again balanced by the force of the wound springs 67. As has been hereinbefore explained, when this balance occurs, the brake levers 80 will occupy the brake release position and the brakes will be released.

If brake shoe wear occurs while the controller 13 is in its second braking position, the slack adjusting mechanism will operate in the manner hereinbefore described so that the screw-threaded sleeve member 94 is unscrewed from the screw-threaded portion of the brake rod 96, thus moving the brake shoes in the direction of the corresponding wheels and taking up the slack occurring as a result of the wearing away of the brake shoes.

Assuming that the controller 13 is in its release position, let it be supposed that the operator on the leading car in the train desires to make a full brake application. To do so, he will move the controller 13 from its release position to its full brake application position. When the drum 162 of the controller 13 occupies its full brake application position, the segments 161, 184 and 167 carried by the drum 162 are, respectively, out of contact with the stationary contacts 165, 185 and 168. Therefore, no current is supplied from the battery 163 to the control wires 14 and 15. When no current is supplied to the control wires 14 and 15, the relays 11 and 12 on each car in the train will be deenergized so that their corresponding contacts occupy a dropped-out position. When the contacts 172, 173 and 179 occupy their dropped-out position, no power supply circuit extends from the generator 7 to the torque motors 1 and 2 on each of the respective cars in the train. Consequently, these torque motors 1 and 2 and the corresponding pumps 3 and 4 are stopped so that no fluid under pressure is discharged from the pumps and supplied to the chambers 39 of the various brake assemblies 6. Therefore, upon cessation of the supply of fluid under pressure to the various chambers 39, the corresponding spiral springs 67 unwind to release the stored energy in these springs. As the respective spiral springs 67 unwind to release the stored energy therein, each of these spiral springs 67 effects an application of the brakes in the manner hereinbefore described. However, since no fluid pressure force is present in the chambers 39 of the several brake assemblies 6, the full force of the spiral springs 67 is effective to press the brake shoes against the corresponding wheels to provide a maximum braking force on these wheels.

Should brake shoe wear occur while the controller 13 is in its full brake application position, the slack adjusting mechanism will operate in the manner hereinbefore described to compensate for this shoe wear.

When it is desired to release the full brake application, the operator of the train will move the drum 162 of the controller 13 from its full brake application position back to its release position. When the drum 162 is thus moved back to its release position, the brakes will be released in the manner hereinbefore described in detail and need not be repeated.

If, for any reason, torque motor 1 and its corresponding pump 3 should become inoperative to control the application and the release of the four brake assemblies 6 on the truck at the left-hand end of a car, as viewed in FIG. 1, these four brake assemblies 6 may be manually controlled by operation of the hand pump 18. Assuming that the torque motor 1 and the pump 3 are inoperative, in order to manually apply and release the brakes on the truck at the left-hand end of the car, the operator will first close a cut-out cock 194 that is disposed in the pipe 41 between the discharge outlet of the pump 3 and a pipe T 195 disposed in the pipe 41. The side outlet of the pipe T 195 is connected by a pipe 196 to one end of a second cut-out cock 197, the opposite end of which is connected by a short pipe or nipple 198 to one end of a second pipe T 199, the opposite end of which is connected by a pipe 200 to the discharge outlet of the hand pump 18. The side outlet of the pipe T 199 is connected by a pipe 201 to one side of a third cut-out cock 202. The other side of the third cut-out cock 202 is connected by a pipe 203 to a side outlet of a pipe T 204 that is disposed in a pipe 205 that connects the sump 20 to the supply inlet of the hand pump 18.

After closing the cut-out cock 194, the operator will then open the second cut-out cock 197 and close the third cut-out cock 202. Now, by manually operating the hand pump 18, the operator can effect the supply of fluid under pressure from the sump 20 via the pipe 205 and pipe T 204, the hand pump 18, the pipe 200, the pipe T 199, the pipe 198, the second cut-out cock 197, the pipe 196, the pipe T 195, the pipe 41 and the branches thereof to the chamber 39 in each of the four brake assemblies 6 associated with the truck at the left-hand end of the car, as viewed in FIG. 1. This supply of fluid under pressure from the sump 20 to the chambers 39 in the four brake assemblies 6 will effect a release of the brakes on the truck at the left-hand end of the car, as viewed in FIG. 1, in the manner hereinbefore described. The brakes may be reapplied by opening the cut-out cock 202 whereupon the fluid under pressure in the several chambers 39 of the brake assemblies 6 will flow back to the sump 20.

It will be seen from FIG. 1 that the hand pump 19 is connected to the four brake assemblies 6 associated with the truck at the right-hand end of the car through a set of valves and pipes corresponding to those by which the hand pump 18 is connected to the four brake assemblies 6 associated with the truck at the left-hand end of the car. Therefore, should the motor 2 and pump 4 become inoperative, the four brake assemblies 6 on the truck at the right-hand end of the car may be manually controlled by the hand pump 19 in the same manner as has been hereinbefore described for controlling the four brake assemblies 6 on the truck at the left-hand end of the car by the hand pump 18.

As is apparent from FIG. 1, each car is provided with a hand pump 18 for controlling the manual application and release of the four brake assemblies 6 associated with the truck at the left-hand end of the car and a hand pump 19 is provided for manually controlling the application and release of the four brake assemblies 6 associated with the truck at the right-hand end of the car. Therefore, the four brake assemblies 6 associated with each truck of each car can be manually controlled when desired.

When the brake shoe 22 has completely worn out and it is replaced with a new shoe, it is necessary to reduce the length of brake rod 96 since the thickness of the new brake shoe is greater than that of the worn shoe. The length of brake rod 96 may be reduced by applying a suitable wrench to the adjusting nut 151 and manually rotating the adjusting nut 151 in the proper direction until the length of the brake rod 96 has been reduced the required amount.

Figure 5:
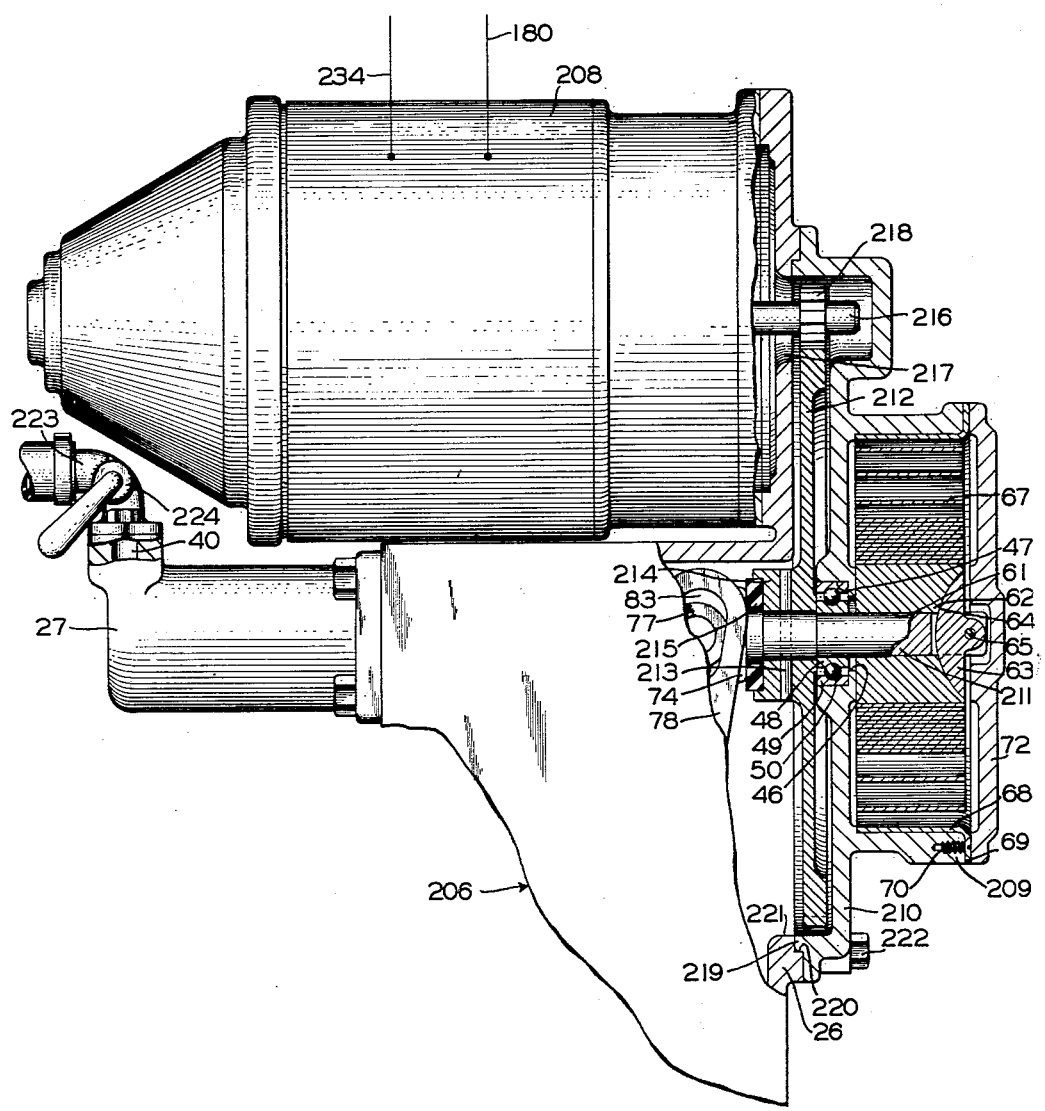
FIG. 5 is an elevational view, mainly in outline, of a unit brake assembly, showing a second embodiment of the invention in which an electric torque motor acts through a gear train to hold a spring-applied brake in a release position.
Figure 6:
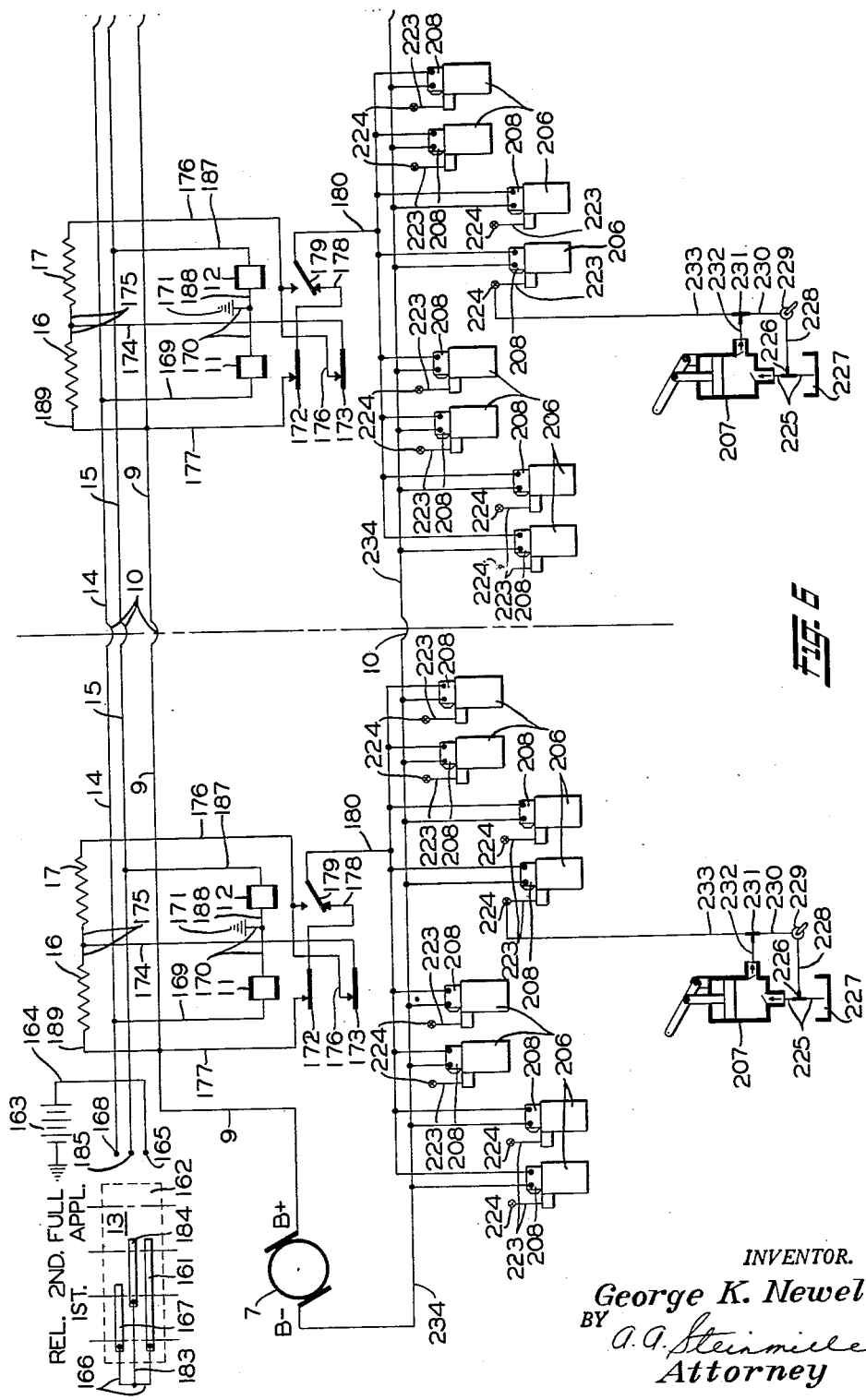
FIG. 6 is a diagrammatic view, of an electric control system for a multiple vehicle train in which each car is provided with a plurality of the spring-applied torque motor released unit brake assemblies shown in FIG. 5.

*Description—Figs. 5 and 6*

FIG. 6 of the drawings shows a multiple unit, electrically controlled, spring-applied-torque-motor-released brake system that constitutes a second embodiment of the invention. This brake system for a railway train consisting of a plurality of railway vehicles including a locomotive or a self-propelled car comprises for each vehicle eight spring-applied-torque-motor-released unit brake assemblies 206, suitable electrical control apparatus for effecting operation of the brake assemblies 206 by means of a controller on the leading vehicle in the train, and a hand pump 207. Since the controller on the leading vehicle in the train may be identical in construction to the controller 13 shown in FIG. 1, corresponding parts of the two controllers are identified by the same reference numerals without additional description.

The electric control apparatus provided on each vehicle in the train for operating the eight brake assemblies 206 for the respective vehicle is identical in construction to the electrical control apparatus shown in FIG. 1. Therefore, corresponding parts of the two electrical control apparatus are identified by the same reference numeral without additional description.

The brake assembly 206 may be identical in construction to the brake assemblies 6 shown in FIGS. 2, 3 and 4 except that a torque motor 208 is provided for effecting a release of the brakes in addition to the piston 35 shown in FIG. 2, which piston is operative by fluid under pressure when effecting a manual release.

As shown in FIG. 5, each of the brake assemblies 206 is identical in construction to the brake assemblies 6 except as noted below.

The spring case 28 shown in FIG. 2 is replaced by a spring case 209 that is similar to the spring case 28. However, the spring case 209 is provided with a flange 210 that differs in construction from the flange 44 of the spring case 28. The flange 210 is cup-shaped to provide a chamber for receiving a gear train which will hereinafter be described in detail.

The screw used in the brake assembly 206 corresponding to the screw 53 used in the brake assembly 6 differs from that used in the brake assembly 6 in that it has a reduced portion 211 which is similar to the reduced portion 59 except that it is somewhat longer in order that a gear 212 may be mounted thereon adjacent the left-hand side of the bearing races 48 and 49 and secured thereto by means of a pin 213 that extends through a hub 214 of the gear and through the reduced portion 211. The left-hand side of the hub 214 is provided with a resilient insert 215, which may be constructed of some suitable material such as rubber, to provide a cushioned stop for the traveling nut 74, when the torque motor 208 rotates or spins the screw to move the traveling nut 74 therealong in the direction of the right hand until this nut is stopped by the insert 215.

The torque motor 208 is provided with an armature shaft 216 that extends through an opening or bore 217 formed in the right-hand wall of the main casing section 26. Keyed to the armature shaft 216 by a key (not shown) is a pinion 218. The pinion 218 and gear 212 have a line of contact between corresponding teeth thereon thereby providing for the gear 212 to be driven by the torque motor 208 through the pinion 218 to effect wind-up of the spiral spring 67 and a release of the brakes.

The flange 210 of the spring case 209 is provided with an annular rib 219 which fits in a counterbore 220 that is coaxial with a bore 221 corresponding to the bore 43 shown in FIG. 2 and extending through the right-hand wall of the main casing section 26. The flange 210 of the spring case 209 is rigidly secured to the main casing section 26 by a plurality of cap screws 222, only one of which appears in FIG. 5 of the drawings.

As shown in FIG. 5, one end of a pipe 223 is screw-threaded into the port 40 of the brake cylinder section 27 and a cut-out cock 224 is interposed therein.

If, for any reason, any one of the eight brake assemblies 206 on each of the respective vehicles in a train should become inoperative to effect a brake application and release on the corresponding wheel, the inoperative assembly 206 may be manually controlled by operation of the hand pump 207 provided on each vehicle in the train. The supply inlet port of the pump 207 (FIG. 6) is connected by a pipe 225 having a pipe T 226 disposed therein to a sump 227, the capacity of which is sufficient to store the required amount of liquid necessary for effecting the release of one brake assembly 206. The side outlet of the pipe T 226 is connected by a pipe 228 to one side of a cut-out cock 229. The other side of the cut-out cock 229 is connected by a pipe 230 to one end of a pipe T 231, the side outlet of which is connected by a pipe 232 to the discharge outlet of the hand pump 207. One end of a flexible hose 233 is connected to the other end of the pipe T 231. The opposite end of the flexible hose 233 carries a quick disconnect coupling comprising therein a valve for automatically establishing a communication therethrough whenever the quick disconnect coupling is coupled up to the open end of a pipe 223. Thereafter the corresponding cut-out cock 224 is opened so that fluid under pressure may be supplied to the corresponding brake assembly 206 to which the flexible hose 233 is connected by manual operation of the hand pump 207 to effect a brake release of the respective brake assembly 206, should, for any reason, the torque motor 208 of this brake assembly become defective or inoperative to effect operation of this brake assembly to its brake release position.

It will be noted from FIG. 6 that the torque motors of the eight brake assemblies 206 on each of the respective vehicles are connected in parallel between the corresponding wire 180 and a wire 234 that extends from end to end of each vehicle and is connected by an electrical connector 10 between the vehicles. As viewed in FIG. 6, the left-hand end of the wire 234 on the leading vehicle in the train is connected to the negative terminal of the generator 7 carried on this vehicle.

*Operation—FIGS. 5 and 6*

In operation, let it be assumed that the controller 13 shown in FIG. 6 of the drawings is moved to its release position. When the controller 13 occupies its release position, current is supplied from the battery 163 to only the control wire 14 through the same circuit described in detail in connection with the embodiment of the invention shown in FIG. 1. This supply of electric current to the control wire 14 is effective to cause each of the relays 11 on the respective vehicle in the train to be energized whereupon the contacts 172 and 173 of each of the relays 11 are picked up to respectively connect the wire 177 to the wire 178, and the wire 174 to the wire 176. With the contact 172 of the relay 11 on each of the respective vehicles in the train in its picked-up or closed position, a first power supply circuit is established to the torque motor 208 of each of the brake assemblies 206 on the several vehicles in the train. This first power supply circuit extends from the generator 7, located on the leading car, via the train wire 9 that extends from vehicle to vehicle through the train, since the wire 9 on each vehicle is connected by an electrical connector 10 between the vehicles to the train wire 9 on the adjacent vehicle, a branch wire 177 on each respective vehicle, and the contact 172 of the respective relay 11, which contact is now in its picked-up position, to the wire 178 that extends from one side of the contact 172 to one side of the contact 179 of the relay 12 when this contact occupies its dropped-out position. When the contacts 179 of the respective relays 12 occupy their dropped-out position, each contact 179 is effective to establish a circuit from the corresponding wire 178 to the wire 180 which has eight branches connected respectively to the positive terminal of the eight torque motors 208 on the corresponding vehicle in the train. The negative terminal of each of the respective torque motor 208 is connected to one of eight branches of the wire 234 on each of the respective vehicles in the train. Since one end of the wire 234 on the leading vehicle in the train is connected to the negative terminal of the generator 7 on the leading vehicle, current will now be supplied to the respective torque motor 208 associated with each brake assembly 206 on each of the respective vehicles in the train.

When the eight torque motors 208 on each of the respective vehicles in the train are supplied with current through the respective power supply circuits traced above, these torque motors 208 are rendered effective to rotate their respective armature shafts 216 (FIG. 5) and the corresponding pinion 218 keyed thereto in a brake releasing direction. Since the pinion 218 drives the corresponding gear 212, the gears 212 rotate the corresponding screw 53 since the gear 212 is anchored to the reduced portion 211 of the screw 53 by the pin 213. Since the traveling nut 74 is restrained from rotation by being disposed between the jaws 78 and 79 at the upper end of the brake lever 80, the traveling nut 74 will travel along the screw 53 in the direction of the right hand until the right-hand end of the traveling nut 74 abuts the resilient insert 215 in the hub 214 of the gear 212. Since the right-hand end of the nut 74 now abuts the resilient insert 215, the nut cannot travel along the screw 73 any further in the direction of the right hand. Consequently, the torque motors 208 are stalled in the brake release position of the corresponding brake levers 80. Furthermore, this rotation of the screw 53 effects rotation of the hub 62 therewith to wind up or tighten the spiral spring 67 about the hub 62 as the brake lever 80 is rocked to its release position by movement of the traveling nut 74 in the direction of the right hand along the screw 73.

It should be understood that each of the torque motors 208 is provided with sufficient heat radiation capacity that it may remain in a stalled condition for an indefinite period of time in which the brakes are released without overheating the torque motors 208. Since the brake levers 80 are rocked to their respective brake release positions, when the right-hand end of the corresponding traveling nut 74 is moved into abutting relationship with the resilient insert 215 in the hub 214 of the gear 212, it will be understood that the corresponding brake shoes are moved away from the respective wheels to effect a release of the brakes on the entire train.

In operation, when it is desired to effect a light brake application, the controller 13 shown in FIG. 6 is moved from its release position to its first braking position. When the controller 13 occupies its first braking position, the segments 167 and 184 carried by the drum 162 are in a position to connect the battery 163 to the respective control wires 14 and 15 in the manner previously described in detail in connection with FIG. 1. Since current is supplied to the control wire 14, as was the case when the controller 13 occupied its brake release position, the contacts of relay 11 on each of the respective vehicles will remain picked-up. The current supplied to the control wire 15, when the controller 13 is moved to its first braking position, will flow from the control wire 15 through each of the respective wires 187 to the coil of the respective relay 12 on each of the several cars in the train, thence to ground at 171 and operate these relays 12 to pick up their respective contacts 179 from a dropped-out position to a picked-up position in which the contacts 179 connect the corresponding wire 180 to the corresponding wire 176. When the contact 179 of each relay 12 thus operates from a dropped-out position to a picked-up position, it opens the first power supply circuit hereinbefore described to the torque motors 208 on each of the respective vehicles in the train and establishes a second power supply circuit to the several torque motors 208. This second power supply circuit for the torque motors 208 extends from the positive side of the generator 7 on the leading vehicle in the train via the wire 9, the wire 189, the resistance 16 on the respective vehicle, the wire 175, wire 174, and contact 173 of the relay 12 on the respective vehicle, which contact is now in its picked-up position, to the wire 176, thence through the contact 179 of the respective relay 12, which contact is now in its picked-up position, to the wire 180 and thence through the several branches thereof to the positive terminal of each of the torque motors 208, thence through the torque motors 208 to the negative terminal thereof each of which is connected to a branch of the wire 234, which wire 234, as shown in FIG. 6, has its left-hand end connected to the negative terminal of the generator 7 on the leading vehicle in the train. Since each of the eight torque motors 208 provided on each vehicle in the train is now supplied with electric current through the second power supply circuit which includes therein in series the respective resistance 16 on each vehicle, the output torque of each of the torque motors 208 is reduced due to the insertion of the resistance 16 in the second power supply circuit for the torque motors 208 on the respective vehicles. When the output torque of the torque motor 208 of each of the brake assemblies 206 is thus reduced by cutting in the respective resistance 16, the maximum output torque of the respective torque motors 208 on the respective vehicles is accordingly correspondingly reduced. Consequently, upon this reduction in the output torque of the torque motors 208, there is insufficient force to maintain the spiral spring 67 in the respective brake assemblies 206 in its completely wound position. Therefore, when the output torque or torque capacity of the torque motors 208 of the respective brake assemblies 206 is reduced in the manner just explained, the corresponding spiral spring 67 of each of the brake assemblies 206 unwind partially to release the stored energy in the spring until the remaining stored energy in the spring balances the reduced output torque of the corresponding torque motors 208. As the respective spiral springs 67 unwind to release the stored energy therein, each of these spiral springs 67 effects, as viewed in FIG. 4, counterclockwise rotation of the corresponding hub 62 since the inner end of the respective spiral springs 67 is disposed in the corresponding slot 66 in the respective hubs 62. Since each of the hubs 62 is connected to the corresponding reduced portion 211 shown in FIG. 5 of a screw 53 (FIG. 2) through the key 63 and pin 65, the rotation of the hub 62 by the spring 67 effects rotation of the reduced portion 211 of the screw 53 in the ball bearing constituted by the balls 50 and the races 48 and 49. This rotation of each of the screws 53 by the corresponding spring 57 is effective to cause the corresponding traveling nut 74 to travel along the respective screw 53 in the direction of the left hand, as viewed in FIG. 5, since the jaws 78 and 79 of the brake lever 80 prevent turning of the traveling nut 74. Therefore, as the traveling nut 74 in each brake assembly 206 travels in the direction of the left hand along the corresponding screw 53, the respective traveling nut 74 effects rocking of the corresponding brake lever 80 in a counterclockwise direction about the pin 86 to effect an application of the brakes in the manner hereinbefore described in detail in connection with FIGS. 1, 2 and 3.

When it is desired to release the light brake application, the operator of the train will move the controller 13 back to its release position. When the drum 162 of the controller 13 is moved back to its release position, the supply of current from the battery 163 to the control wire 15 is cut off, as explained in connection with FIG. 1. Likewise, as explained in connection with FIG. 1, current remains supplied from the battery 163 to the control wire 14 when the controller 13 is returned to its release position to maintain the respective relays 11 on the several vehicles on the train energized so that their corresponding contacts 172 and 173 remain in their picked-up position. Upon deenergization of the control relays 12 on the respective vehicles due to cut off of current to the control wire 15 in response to moving the controller 13 back to its release position, the respective contacts 179 of the relays 12 will drop out to the position shown in FIG. 6 to reconnect wire 178 to wire 180 on each of the respective vehicles in the train. When the respective contacts 179 thus return to their dropped-out position, the respective resistance 16 on each of the respective vehicles is cut out of the power supply circuit to the corresponding brake units 206 on this vehicle. Since the relay 11 on each of the vehicles is picked up when the controller 13 is in its release position, the hereinbefore-described first power supply circuit for the torque motors 208 on the respective vehicles is re-established. As the corresponding resistance 16 is no longer in the power supply circuit to the torque motors 208 on the respective vehicles, the output torque of the respective torque motors 208 on each of the respective vehicles will now increase to its maximum value. Consequently, the respective torque motors 208 will now, through the respective pinions 218 and gears 212, rotate the corresponding screws 53 to move the corresponding traveling nuts 74 therealong in the direction of the right hand, as viewed in FIG. 5, until the brake levers 80 are rocked, as viewed in FIG. 2, in a clockwise direction to their brake release position and to wind up the corresponding spiral springs 67 until they are completely wound. At this time the traveling nut 74 will abut the resilient insert 215 in the hub 214 of the gear 212. The brakes will now remain released as long as the controller 13 remains in its release position since in this position current is supplied from battery 163 to the control wire 14 to maintain the relay 11 picked up while the control wire 15 is cut off from the battery 163 so that the contact 179 of the relay 12 will remain in its dropped-out position.

With the contact 172 of each of the respective relays 11 in its picked-up position and the contact 179 of each of the respective relays 12 in its dropped-out position, the hereinbefore-described first power supply circuit is closed so that the generator 7 on the leading vehicle supplies electric current to each of the torque motors 208 of the several brake assemblies 206 on each of the vehicles in the train. Therefore, the several torque motors 208 will maintain the brakes release on the entire train as long as the controller 13 remains in its release position.

Now let it be supposed that while the brakes are released, the operator on the leading vehicle of the train desires to effect a moderately heavy brake application to provide a retarding force acting on the respective wheels which is greater than the retarding force when a light brake application is effected by moving the controller 13 to its first braking position.

Assuming that the controller 13 is in its release position, the operator on the leading vehicle in the train will now move the controller 13 from its release position to its second braking position. As has been hereinbefore described in detail in connection with FIG. 1, when the controller 13 is moved to its second braking position from its release position, the supply of electric current from the battery 163 to the control wire 14 is cut off and the circuit is established for effecting the supply of electric current from the battery 163 to the control wire 15. When the supply of electric current to the control wire 14 is cut off, the respective relays 11 on the several vehicles in the train are deenergized whereupon the contacts 172 and 173 of the respective relays 11 return to their dropped-out position. When the battery 163 is connected to the control wire 15 by moving the controller 13 to its second braking position, current flows from the battery 163 to the control wire 15 whereupon the respective relays 12 on the several vehicles in the train are energized through the power supply circuit hereinbefore described in detail in connection with FIG. 1. When the respective relays 12 on the several cars in the train are thus supplied with current from the battery 163, they operate to pick up their respective contacts 179 to a closed position. Since the contacts 172 and 173 of the relays 11 are now in their dropped-out position, current will flow from the positive terminal of the generator 7 on the leading vehicle to the wire 9 that extends from vehicle to vehicle through the train and then through the respective wire 189 on each vehicle in the train, the corresponding resistance 16, wire 175, resistance 17, wire 176, contact 179 of the respective relays 12, which contacts 179 occupy their picked-up position, to the wire 180 and thence to the positive terminal of each of the torque motors 208 of each of the brake assemblies 206 on the entire train. Since the negative terminal of each of the torque motors 208 is connected to the wire 234 on the several vehicles in the train which wire 234 is connected to the negative terminal of the generator 7, a third power supply circuit is thus completed for effecting supply of electric current from the generator 7 on the leading vehicle in the train to each torque motor 208 on each vehicle in the train. Since this current must flow through the respective resistances 16 and 17 in series to the torque motors 208, these two resistances 16 and 17, now connected in series in the third power supply circuit, are effective to further reduce the output torque of each of the torque motors 208 on the respective vehicles to a value less than that obtained when the controller 13 was moved to its first braking position. When the output torque or torque capacity of the torque motors 208 on the respective vehicles is thus reduced by cutting in the respective resistances 16 and 17 on the respective vehicles, the output torque or torque capacity of the respective torque motors 208 is insufficient to maintain the corresponding spiral springs 67 in the respective brake assemblies 206 in their completely wound position. Therefore, when the torque output of the several torque motors 208 is reduced in the manner just explained, the corresponding spiral spring 67 in each of the brake assemblies 206 unwinds to release the stored energy in the spring until the remaining stored energy in the spring balances the output torque of the respective torque motors 208. As the respective spiral spring 67 unwinds to release the stored energy therein, each of these spiral springs 67 effects rotation of the corresponding screw 53 of the respective brake assembly 206 in a direction to effect an application of the brakes in the manner hereinbefore described in detail in connection with FIGS. 1, 2 and 3. It should be noted that a greater braking force is applied to the wheels than was applied when effecting a light brake application since the output torque of the torque motors 208 is reduced more than it was when the controller 13 was moved to the first braking position.

When it is desired to release the moderately heavy brake application, the operator of the train will move the drum 162 of the controller 13 back to its release position. When the drum 162 is thus moved back to its release position, the brakes on the entire train will be released in the manner hereinbefore described in detail in connection with effecting the release of the brakes after a light brake application.

Assuming that the controller 13 occupies its release position, let it be supposed that the operator on the leading vehicle in the train desires to effect a full brake application. To effect a full brake application, the operator will move the controller 13 from its release position to its full brake application position. As has been described in connection with FIG. 1, when the controller 13 occupies its full brake application, no current is supplied from the battery 163 to the control wires 14 and 15. When no current is supplied to the control wires 14 and 15, the respective relays 11 and 12 on each vehicle in the train will be deenergized so that their corresponding contacts occupy a dropped-out position. When the contacts 172, 173 and 179 occupy their dropped-out position, no power supply circuit extends from the generator 7 to the eight torque motors 208 on each of the several vehicles in the train. Consequently, no current is supplied from the generator 7 to the torque motors 208 whereupon the output torque of these torque motors is reduced to zero. Therefore, upon the cut off of the supply of electric current to all of the torque motors 208, the corresponding spiral springs 67 in the respective brake assemblies 206 unwind to release the stored energy in these springs and effect a full application of the brakes in the manner hereinbefore described in connection with FIGS. 1, 2, 3 and 4. Consequently, the full force of each spiral spring 67 is effective to press the corresponding brake shoe against the corresponding wheel of each vehicle in the train to provide a maximum braking force on all of the wheels on each vehicle.

Should brake shoe wear occur while the controller 13 is in its first braking position, second braking position, or full brake application position, the slack adjusting mechanism of the respective brake assemblies 206, which slack adjusting mechanism is identical with the slack adjusting mechanism of the brake assembly 6, will operate in the manner hereinbefore described to compensate for this brake shoe wear.

When it is desired to release the full brake application, the operator of the train will move the drum 162 of the controller 13 from its full brake application position back to its brake release position. When the drum 162 is thus moved back to its release position, the brakes on the entire train will be released in the manner hereinbefore described in detail.

If, for any reason, the torque motors 208 of any one of the eight brake assemblies 206 on each vehicle in the train should become inoperative to effect the application and release of the brakes on the associated wheel, the inoperative brake assembly 206 may be manually controlled by the operation of the hand pump 207 on the respective cars.

To effect manual control of the inoperative brake assembly 206, the quick disconnect coupling on the end of the flexible hose 233 is coupled up to the open end of the corresponding pipe 223. Thereafter the corresponding cut-out cock 224 of the inoperative brake assembly 206 is opened. As has been hereinbefore mentioned, the quick disconnect coupling comprises therein a valve for automatically establishing a communication therethrough when the disconnect coupling is coupled up to the open end of a pipe 223. After connecting the quick disconnect coupling to the open end of the corresponding pipe 223, the operator will open the cut-out cock 224 and then close the cut-out cock 229 to prevent fluid under pressure discharged from the pump 207 returning to the sump 227. Now, by manually operating the hand pump 207, the operator can effect the supply of fluid under pressure from the sump 227 via the pipe 225 and pipe T 226 therein, the hand pump 207, the pipe 232, the pipe T 231, the flexible hose 233, the now open cut-out cock 224 in the pipe 223, and the port 40 (FIGS. 2 and 5) in the brake cylinder section 27 to the chamber 39 therein. This supply of fluid under pressure from the sump 227 to the chamber 39 in the inoperative brake assembly 206 will effect movement of the piston 35 in the bore 34 of the brake cylinder section 27 in the direction of the right hand, as viewed in FIG. 2. This movement of the piston 35 in the direction of the right hand will effect clockwise rocking of the brake lever 80 thereabout the pin 86 to cause the corresponding brake shoe 22 and break head 24 of the inoperative brake assembly 206 to move away from the tread surface of the wheel 23 associated with the inoperative brake assembly to effect a release of the brakes in the manner hereinbefore described in detail in connection with the brake assembly 6. The brake shoe 22 associated with the inoperative brake assembly 206 may be reapplied or moved into braking contact with the tread of the wheel associated with this brake assembly by opening the cutout cock 229 whereupon the fluid under pressure in the chamber 39 of the inoperative brake assembly 206 will be forced back to the sump 227 as the spiral spring 67 of the inoperative brake assembly 206 unwinds to effect counterclockwise rocking of the brake lever 80 to bring the brake shoe 22 associated with the inoperative brake assembly 206 into braking contact with the corresponding wheel 23 in the manner hereinbefore described in detail.

It will be evident from FIG. 6 and the above-described manual brake application that the operator of the train can effect selective operation of any one of the eight brake assemblies 206 on each vehicle by means of the single hand pump 207 provided on the respective vehicle.

When a brake shoe associated with a brake assembly 206 has completely worn out and it is necessary to replace it with a new shoe, the length of the brake rod 96 can be reduced in the same maner hereinbefore described in detail in connection with the brake assembly 6.

Having now described the invention, what I claim as new and desire to secure by Letters Patent, is:

1. A unit brake assembly for a vehicle wheel comprising:

(a) brake shoe means for applying a braking force to a vehicle wheel, (b) a pivoted lever effective upon rocking in one direction to apply said brake shoe means and upon rocking in the opposite direction to release said brake shoe means, and (c) means for actuating said pivoted lever including:
 (i) a screw-threaded member rotatably mounted for rotation on its longitudinal axis,
 (ii) spring means connected to said screw-threaded member so as to be wound up upon rotation of the screw-threaded member in one direction and to exert a force tending to rotate said screw-threaded member in the opposite direction,
 (iii) a traveling nut operatively associated with said screw-threaded member and connected to said pivoted lever so as to rock said lever in opposite directions corresponding to the direction of travel of said traveling nut on said screw-threaded member, and
 (iv) power means for rotating said screw-threaded member in one direction to cause travel of said traveling nut in a direction to rock said pivoted lever to release said brake shoe means and to maintain it there and at the same time to cause wind-up of said spring means.

2. A unit brake assembly, as claimed in claim 1, for a vehicle wheel, further characterized in that said power means comprises a piston subject to fluid under pressure and operable to effect travel of said traveling nut along said screw in the direction to rock said lever to a brake release position.

3. A unit brake assembly, as defined in claim 1, for a vehicle wheel, further characterized in that said power means comprises a torque motor and a gear train operatively connecting said torque motor to said screw-threaded member whereby rotation of said screw-threaded member in a brake releasing direction is effected by said torque motor upon the supply of electric power thereto.

4. A unit brake assembly, as claimed in claim 1, for a vehicle wheel, characterized in that said pivoted lever is pivoted at one end thereof and operatively connected to the traveling nut at the opposite end, and further characterized by a rigid rod connected to said brake shoe means and swivelly connected to said pivoted lever intermediate the ends thereof in a manner to shift said brake shoe means into and out of braking engagement with the vehicle wheel upon corresponding pivotal movement of said lever.

5. A unit brake assembly for applying a braking force to a wheel of a railway car truck frame, said brake unit comprising in combination:
 (a) a casing fixed with respect to the car truck frame and having a chamber therein,
 (b) said casing having two spaced walls each with at least one opening therein,
 (c) a casing section mounted on one of said walls over one opening therein,
 (d) said casing section having a bore registering with said one opening in said one wall,
 (e) a hollow piston member operative in said bore and movable in one direction responsive to the supply of hydraulic pressure to one side thereof,
 (f) a first bearing member mounted in the opening of the other of said walls,
 (g) a screw-threaded member rotatably mounted intermediate its ends in said first bearing member,
 (h) a second bearing member rotatably mounting one end of said screw-threaded member in said hollow piston member,
 (i) a spiral spring disposed about the portion of said screw-threaded member that is on the side of said first bearing member opposite said one end,
 (j) said spiral spring having its inner end secured to said portion of said screw-threaded member and its outer end secured to said casing,
 (k) a brake lever disposed within and rockably mounted at its one end on said casing,
 (l) traveling nut means having screw-threaded engagement with said screw-threaded member and being operatively connected to the other end of said brake lever,
 (m) a brake shoe,
 (n) a brake head carrying said shoe,
 (o) a brake hanger pivotally mounted at one end on said casing and pivotally connected at the other end in supporting relation to said brake head,
 (p) a rigid rod member pivotally connected at its one end to the brake head and extending through one wall of said casing into said chamber, and
 (q) universal swivel means connecting the portion of said rigid rod member within said chamber to said brake lever intermediate its ends whereby movement of the brake shoe out of and into braking contact with the tread surface of the car wheel is effected respectively by movement of said rigid rod member in one direction, responsively to the supply of hydraulic pressure to said hollow piston member, to effect rocking of said brake lever in one direction and windup of said spiral spring through the intermediary of said traveling nut means and the said screw-threaded member, and by movement of said rigid rod member in an opposite direction responsively to the unwinding of said spiral spring upon the release of hydraulic pressure from said hollow piston member to effect rocking of said brake lever in an opposite direction through the intermediary of said screw-threaded member and said traveling nut means.

6. A unit brake assembly for applying a braking force to a wheel of a railway car truck frame, said unit brake assembly comprising in combination:
 (a) a casing fixed with respect to the car truck frame and having a chamber therein,
 (b) said casing having two spaced walls each with at least one opening therein coaxial with the opening in the other,
 (c) a casing section mounted on one of said walls over one opening therein and having a bore therein coaxial with said one opening in said one wall,
 (d) a hollow piston member slidably mounted in the bore in said casing section,
 (e) screw-threaded member rotatably mounted for rotation on its longitudinal axis and having one end portion thereof disposed in the chamber in said casing,
 (f) a spiral spring disposed about the other end portion of said screw-threaded member exteriorly of said chamber,
 (g) said spiral spring having its inner end secured to said other end portion of said screw-threaded member and its outer end secured to said casing,
 (h) a brake lever rockably mounted at its one end on said casing,
 (i) traveling nut means having screw-threaded engagement with the screw-threaded member and being operatively connected to the other end of said brake lever whereby said brake lever prevents rotation of said traveling nut means with said screw-threaded member thereby insuring rocking movement of said brake lever in a brake releasing direction and windup of said spiral spring responsive to supply of hydraulic pressure to one side of said hollow piston member, and rocking movement of said brake lever in a brake applying direction responsive to the unwinding of said spiral spring upon the release of hydraulic pressure from said one side of said hollow piston member,
 (j) a brake shoe,
 (k) a brake head carrying said shoe,
 (l) a brake hanger pivotally mounted at one end on said casing and pivotally connected at the other end in supporting relation to said brake head, (m) a rigid rod member pivotally connected at one end to said brake head and extending through one wall of said casing into said chamber, and (n) universal swivel means connecting the portion of said rigid rod member within said chamber to said brake lever intermediate the ends thereof whereby movement of said brake shoe out of and into braking contact with the tread surface of said wheel is effected responsively to the rocking movement of said brake lever in said brake releasing direction and in said brake applying direction respectively.

7. A unit brake assembly as defined in claim 5, characterized in that the rigid rod member comprises two parts, one of which is a screw member and the other of which is an internally threaded sleeve member in which the screw member is received, and further characterized by a U-shaped housing rotatably mounted on said sleeve member, means operatively connecting said brake lever to said U-shaped housing for effecting rotation thereof in response to rocking of said brake lever, a pawl pivotally mounted on said U-shaped housing, a ratchet wheel keyed to said sleeve member and engaged by said pawl, and a spiral spring connected at one end to said brake lever and at the opposite end to said U-shaped housing, said pawl and ratchet wheel being effective to cause rotational movement of the sleeve member relative to the screw member in response to rocking of said brake lever in a brake releasing direction subsequent to rocking of said lever through more than a certain angle out of its brake release position in a brake applying direction as a result of shoe wear.

8. A unit brake assembly, as claimed in claim 1, further characterized in that said means for actuating said pivoted lever comprises, in addition to said power means:

(a) a cylindrical casing section having a bore, and (b) a hollow piston member slidably mounted in the bore in said cylindrical casing section, said hollow piston member being effective responsively to fluid pressure supplied to said cylindrical casing for exerting a force to move said traveling nut along said screw-threaded member and thereby to effect rotation thereof in a direction to cause rocking of said pivoted lever to release said brake shoe means independently of said power means.

9. A unit brake assembly, as defined in claim 5, further characterized in that the rigid rod member comprises two parts, one of which is a non-rotative screw member connected to the brake head and the other of which is an internally threaded rotative sleeve member in which the screw member is received, and further including a U-shaped member rotatably carried on said sleeve member, means operatively connecting said brake lever to said U-shaped housing for effecting rotation thereof in response to rocking of said brake lever, a pawl pivoted on said U-shaped member, a ratchet wheel fixed on said sleeve, both said pawl and said ratchet wheel being disposed between the opposite legs of said U-shaped member, said ratchet wheel being operated by said pawl upon the rocking of said brake lever in a brake releasing direction subsequent to the rocking of said brake lever in a brake-applying direction through an angle greater than a chosen angle, whereby the rocking of said brake lever in said brake releasing direction effects rotation of said ratchet wheel and thereby said sleeve member relative to said screw member to vary the length of said rigid rod member.

10. A unit brake assembly, as defined in claim 5, further characterized in that the rigid rod member comprises two parts, one of which is a non-rotative screw member connected to the brake head and the other of which is an internally threaded rotative sleeve member in which the screw member is received, and further including a U-shaped member mounted on said sleeve, a ratchet wheel mounted on said sleeve member between the opposite legs of said U-shaped member, a key connecting said ratchet wheel to said sleeve member, a pawl member pivotally mounted on said U-shaped member between the opposite legs thereof for effecting rotational movement of said ratchet wheel and thereby said sleeve member relative to said screw member, a linkage operatively connecting said U-shaped member to said brake lever for effecting rotation of said U-shaped member in one direction in response to rocking said brake lever in a brake applying direction, and a spring biasing means operatively connected at one end to said brake lever and at the opposite end to said U-shaped member, said spring biasing means being effective to be tensioned by rocking of said brake lever in said brake-applying direction and being operative to effect rotation of said U-shaped member in the opposite direction upon said brake lever being rocked in a brake releasing direction, whereby said ratchet wheel is rotated by said pawl subsequent to rocking said brake lever in a brake applying direction through an angle greater than a chosen angle.

11. A unit brake assembly, as defined in claim 5, further characterized in that the rigid rod member comprises two parts, one of which is a non-rotative screw-threaded member connected to the brake head and the other of which is an internally threaded rotative sleeve member in which the screw-threaded member is received, and further including a lever pivoted on said casing and rockably connected to said brake lever, a ratchet wheel attached to said sleeve member for rotating said sleeve member on said screw member, a U-shaped member rotatably mounted on said sleeve member, a pawl pivotally mounted on said U-shaped member between the opposite legs thereof, a linkage operatively connecting said U-shaped member to said lever for effecting rotation of said U-shaped member in one direction, and a spring-biasing means connected at one end to said brake lever and at the opposite end to said U-shaped member for effecting rotation of said U-shaped member in the opposite direction subsequent to rotation of said U-shaped member in said one direction in response to rocking of said brake lever in a brake-applying direction through an angle greater than a chosen angle to effect ratcheting of said pawl over one tooth on said ratchet wheel whereupon the subsequent rocking of said lever in a brake releasing direction effects rotation of said ratchet wheel and said sleeve member with respect to said screw-threaded member to increase the length of said rigid rod member as a result of brake shoe wear.

12. A unit brake assembly, as defined in claim 5, further characterized in that the rigid rod member comprises two parts, one of which is a non-rotative screw-threaded member connected to the brake head and the other of which is an internally threaded rotative sleeve member in which the screw-threaded member is received, and further including a pair of spaced-apart lugs carried on the pivoted end of said brake lever, a lever pivoted on said casing, said lever being operative by that one of said lugs most remote from the pivoted end of said lever upon rotation of said brake lever in a brake-applying direction through a chosen angle and said other lug having a lost motion connection with said lever whereby said second lug only effects rotation of said lever upon rotation of said brake lever in a brake-applying direction through an angle greater than said chosen angle, a U-shaped member mounted on said sleeve for rotation therewith, a linkage operatively connecting said lever to said U-shaped member for effecting rotation of said U-shaped member in one direction, a pawl operatively mounted on said internally threaded rotative sleeve member between the arms of said U-shaped member, and a stop carried by said casing for limiting rotation of said U-shaped member in an opposite direction, said stop also being effective to rock said pawl away from the teeth on said ratchet wheel, and said pawl being effective to rotate said ratchet wheel and said sleeve member with respect to said screw-threaded member to increase the length of said rigid rod member as a result of brake shoe wear until said stop terminates rotation of said U-shaped member in said opposite direction.

13. A unit brake assembly, as claimed in claim 5, further characterized in that one of said two spaced walls has a second opening therein, and further including a manually operative dog disposed in said second opening and operatively connected to said internally threaded rotative sleeve member for effecting rotation of said sleeve member with respect to said non-rotative screw-threaded member in response to manual operation of said dog to change the length of said rigid rod member.

14. A brake system for wheeled railway vehicles comprising in combination:
  (a) brake shoe means for applying a braking force to a vehicle wheel,
  (b) a pivoted lever effective upon rocking in one direction to apply said brake shoe means and upon rocking in the opposite direction to release said brake shoe means,
  (c) means for actuating said lever including:
    (i) a screw-threaded member rotatably mounted for rotation on its longitudinal axis,
    (ii) spring means connected to said screw-threaded member so as to be wound upon rotation of the screw in one direction and to exert a force tending to rotate said screw-threaded member in the opposite direction,
    (iii) a traveling nut operatively associated with said screw-threaded member and connected to said pivoted lever so as to rock said lever in opposite directions corresponding to the direction of travel of said traveling nut on said screw-threaded member, and
    (iv) power means for rotating said screw in one direction to cause travel of said traveling nut in the direction to rock the pivoted lever to release the brake shoe means and to maintain it there and at the same time to cause windup of said spring means, and
  (d) control means for controlling the power means to vary the force exerted thereby to cause said spring means to rotate said screw-threaded member reversely and thereby effect travel of said traveling nut in a direction to rock the brake lever to apply said brake shoe means to a corresponding degree.

15. A brake system for wheeled railway vehicles comprising in combination:
  (a) a unit brake assembly for each of said wheels, each of said unit brake assemblies comprising:
    (i) a sectionalized casing,
    (ii) a brake lever pivotally mounted at one end on said casing,
    (iii) a brake shoe for braking one of said wheels,
    (iv) a brake head,
    (v) a brake hanger pivotally connected to said brake head and said brake shoe for supporting said head and shoe on said sectionalized casing,
    (vi) a linkage operatively connecting said brake shoe to said brake lever intermediate the ends of said brake lever,
    (vii) a screw-threaded traveling nut pivotally mounted on the other end of said brake lever,
    (viii) a screw-threaded rod member having screw-threaded engagement with said screw-threaded traveling nut,
    (ix) spiral spring means so connected to said screw-threaded rod member as to be wound up upon rotation of said screw-threaded member in one direction, and operative upon unwinding to rotate said screw-threaded member in the reverse direction to cause movement of said screw-threaded traveling nut therealong in the direction to effect rocking of said brake lever in a brake-applying direction, and
    (x) power means operative to rotate said screw-threaded rod member in the opposite direction to cause movement of said screw-threaded traveling nut therealong in the direction to effect rocking of said brake lever in a brake releasing direction and to wind up said spiral spring means; and
  (b) control means for controlling the power means to vary the force exerted thereby to cause said spring means to rotate said screw-threaded member and thereby effect travel of said traveling nut in the direction to rock said brake lever to apply said brake shoe means to a corresponding degree.

16. A brake system comprising a unit brake assembly, as claimed in claim 8, for each of a plurality of wheels on a railway car, and further characterized by manually controlled pump means for supplying hydraulic fluid under pressure to and releasing hydraulic fluid under pressure from said one side of said hollow piston member of each of said unit brake assemblies to provide emergency control.

17. A brake system comprising a unit brake assembly, as claimed in claim 8, for each of a plurality of wheels on a railway car, characterized by a single manually controlled pump means on the car for supplying fluid under pressure to and releasing fluid under pressure from one side of said hollow piston member of any one of said unit brake assemblies on the car, and further characterized by conduit means for selectively connecting said single manually controlled pump means on the car to any one unit brake assembly on the car.

18. A dual brake system for a railway vehicle, said dual brake system comprising for each wheel of said vehicle:
  (a) a casing immovably secured to said vehicle and having a chamber therein,
  (b) a brake lever pivoted at one end on said casing, and disposed within said casing,
  (c) a brake shoe,
  (d) a brake head carrying said shoe,
  (e) a brake hanger pivotally mounted at its one end on said casing and pivotally connected at its other end in supporting relation to said brake head,
  (f) a rigid rod member movably mounted within the chamber of said casing for axial movement substantially in a straight line, one end of said rigid rod member extending exteriorly of said casing and being pivotally connected to the brake head,
  (g) universal swivel means connecting the portion of said rigid rod member within the chamber to said brake lever intermediate its ends,
  (h) screw-threaded traveling nut means pivotally connected to the other end of said brake lever,
  (i) a screw-threaded rod member having screw-threaded engagement with said screw-threaded traveling nut means, the pitch thereof being such that the application of a force to one side of said traveling nut effects rotation of said screw-threaded rod member in one direction and thereby movement of said screw-threaded traveling nut means therealong to rock said brake lever in a brake applying direction,
  (j) a spiral spring having its inner end secured to one end of said screw-threaded rod member and its outer end secured to said casing whereby rotation of said screw-threaded rod member in said one direction effects wind-up of said spiral spring,
  (k) a first brake release means including a torque motor and a gear train operatively connected to said screw-threaded rod member for effecting rotation thereof in said one direction in response to the supply of electric power to said torque motor,
  (l) a second brake release means including a cylinder and a piston member slidably disposed therein to which piston member the other end of said screw-threaded rod member is rotatably connected whereby said piston member is effective to apply a force to said one side of said traveling nut for effecting rotation of said screw-threaded rod member in response to the supply of hydraulic pressure to one side of said piston member, (m) a first control means for said several first brake release means operable to render the respective several first brake release means effective to cause rocking of the several said brake levers in said brake releasing direction and to wind up said several spiral springs, said first control means being also operable to subsequently control unwinding of said several spiral springs to a desired degree to effect rotation of said several screw-threaded rod members by said spiral springs in a direction opposite said one direction to rock said several brake levers in said brake applying direction, and (n) a second control means for certain of said second brake release means operable to effect the supply of fluid under pressure to and release of fluid under pressure from any one of said cylinders to control operation of its said piston member to effect release and application of its said brake shoe.

References Cited in the file of this patent
UNITED STATES PATENTS

| | | |
|---|---|---|
| 363,310 | Wilson | May 17, 1887 |
| 1,778,317 | Goldman | Oct. 14, 1930 |
| 2,218,605 | Down | Oct. 22, 1940 |
| 2,246,200 | Farmer | June 17, 1941 |
| 2,277,052 | Aikman | Mar. 24, 1942 |
| 2,330,739 | Piron | Sept. 28, 1943 |
| 2,382,263 | Schnell | Aug. 14, 1945 |